US011018371B1

(12) United States Patent
Ji et al.

(10) Patent No.: US 11,018,371 B1
(45) Date of Patent: May 25, 2021

(54) FUNCTIONAL ALIPHATIC AND/OR AROMATIC AMINE COMPOUNDS OR DERIVATIVES AS ELECTROLYTE ADDITIVES TO REDUCE GAS GENERATION IN LI-ION BATTERIES

(71) Applicant: Enevate Corporation, Irvine, CA (US)

(72) Inventors: Liwen Ji, San Diego, CA (US); Benjamin Park, Mission Viejo, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

(21) Appl. No.: 16/831,270

(22) Filed: Mar. 26, 2020

(51) Int. Cl.
*H01M 10/0525* (2010.01)
*H01M 4/583* (2010.01)
*H01M 4/38* (2006.01)
*H01M 10/0567* (2010.01)

(52) U.S. Cl.
CPC ....... *H01M 10/0525* (2013.01); *H01M 4/386* (2013.01); *H01M 4/583* (2013.01); *H01M 10/0567* (2013.01)

(58) Field of Classification Search
None
See application file for complete search history.

(56) References Cited

U.S. PATENT DOCUMENTS

| | | | |
|---|---|---|---|
| 2013/0209870 A1* | 8/2013 | Tsujikawa | H01M 10/4235 429/188 |
| 2015/0188142 A1* | 7/2015 | Yamaguchi | G10L 13/10 429/212 |
| 2020/0203764 A1* | 6/2020 | Ji | H01M 10/0567 |

FOREIGN PATENT DOCUMENTS

JP          2002042864 A  *  2/2002

OTHER PUBLICATIONS

Machine Translation of JP 2002-042864 A (Year: 2002).*
Machotova, Jana et al. "Fluorine containing self-crosslinking acrylic latexes with reduced flammability and their application as polymer binders for heterogeneous cation-exchange membranes". Journal of Applied Polymer Science, vol. 134, No. 43, 2017, p. 45467. Wiley, doi:10.1002/app.45467. (Year: 2017).*

* cited by examiner

*Primary Examiner* — Robert S Carrico
(74) *Attorney, Agent, or Firm* — McAndrews, Held & Malloy, Ltd.

(57) ABSTRACT

Systems and methods for batteries comprising a cathode, an electrolyte, and an anode, wherein functional aliphatic and/or aromatic amine compounds or derivatives are used as electrolyte additives to reduce gas generation in Li-ion batteries.

5 Claims, 23 Drawing Sheets

FUNCTIONAL ALIPHATIC AND/OR AROMATIC AMINE COMPOUNDS OR DERIVATIVES AS ELECTROLYTE ADDITIVES TO REDUCE GAS GENERATION IN LI-ION BATTERIES

TECHNICAL FIELD

Aspects of the present disclosure relate to energy generation and storage. More specifically, certain embodiments of the disclosure relate to a method and system for using functional aliphatic and/or aromatic amine compounds or derivatives as electrolyte additives to reduce gas generation in Li-ion batteries.

BACKGROUND

Conventional approaches for battery electrolytes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method for using functional aliphatic and/or aromatic amine compounds and derivatives as electrolyte additives to reduce gas generation in Li-ion batteries, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
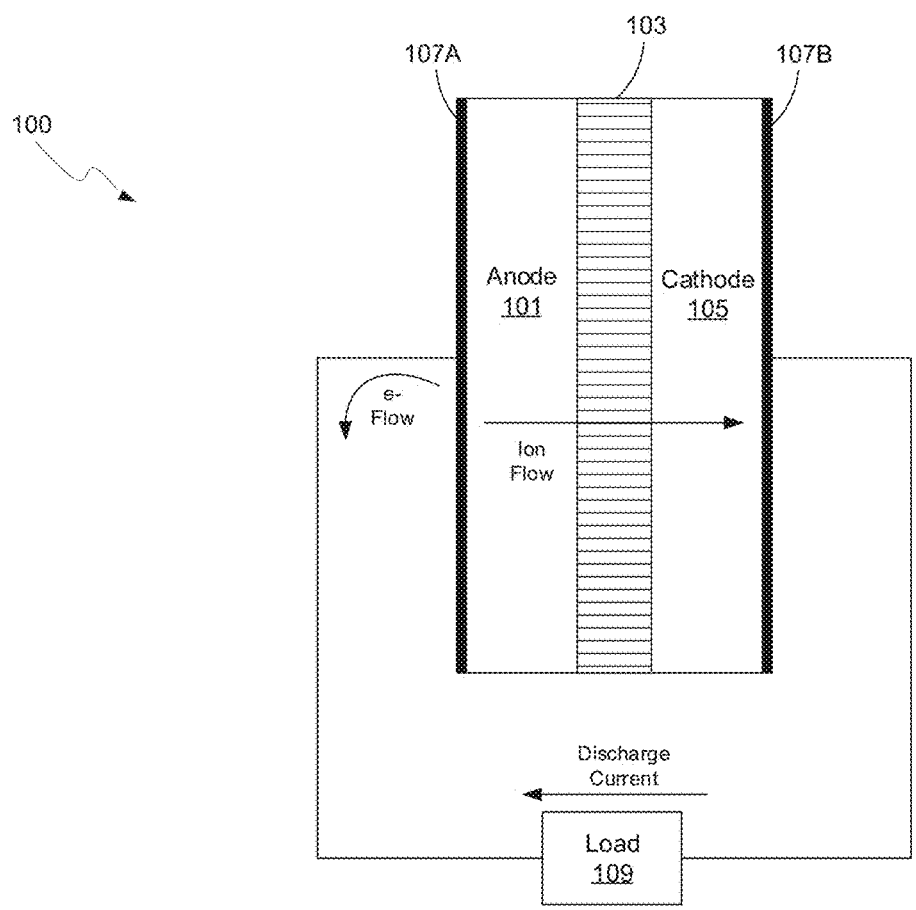
FIG. 1 is a diagram of a battery with an anode, in accordance with an example embodiment of the disclosure.

FIG. 1 is a diagram of a battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 107 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Di-fluoroethylene carbonate (DiFEC), Propylene Carbonate (PC), Trifluoropropylene carbonate (TFPC), Dimethyl Carbonate (DMC), Ethyl Methyl Carbonate (EMC), Diethyl Carbonate (DEC), etc. with dissolved LiBF$_4$, LiAsF$_6$, LiPF$_6$, Lithium bis(oxalato) borate (LiB(C$_2$O$_4$)$_2$; LiBOB), Lithium difluoro(oxalato)borate (LiBF$_2$(C$_2$O$_4$); LiDFOB), Lithium 2-trifluoromethyl-4,5-dicyanoimidazole (C$_6$F$_3$LiN$_4$; LiTDI), Lithium bis(trifluoromethanesulfonyl)imide (LiC$_2$F$_6$NO$_4$S$_2$; LiTFSI), Lithium bis(fluorosulfonyl)imide (F$_2$LiNO$_4$S$_2$, LiFSI), LiPO$_2$F$_2$, LiSiF$_6$, LiClO$_4$, Lithium triflate (LiCF$_3$SO$_3$), Lithium tetrafluorooxalato phosphate (LTFOP), Lithium pentafluoroethyltrifluoroborate (LiFAB), Lithium bis(2-fluoromalonato)borate (LiBFMB), Lithium 4-pyridyl trimethyl borate (LPTB), Lithium 2-fluorophenol trimethyl borate (LFPTB), Lithium catechol dimethyl borate (LiCDMB), etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109.

When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

Lithium-ion batteries have been widely used in, e.g., portable electronics, stationary energy storage devices, and electric vehicles due to their high energy density. Despite major advances over the last few decades, gas generation during the formation, operation and storage of the Li-ion batteries remains a challenge, due to the concomitant volume swelling, performance failure and safety concerns. Gas generation in the formation step of the batteries is mainly originated from the electrochemical decomposition of electrolyte solvents during the solid-electrolyte interphase (SEI) layer formation. Abuse conditions such as overcharging and overheating make the gassing worse or even result in disastrous accidents. Recently, in order to keep pace with increasing energy demands for advanced electronic devices and to achieve service on a wide range of affordable electric vehicles, high capacity, low lithiation/delithiation potential Si anodes and high capacity, high voltage Ni-rich cathodes (such as Lithium Nickel Cobalt Aluminum Oxide ($LiNi_xCo_yAl_zO_2$, x+y+z=1) (NCA) or Lithium Nickel Cobalt Manganese Oxide ($LiNi_aCo_bMn_cO_2$, a+b+c=1) (NCM or NMC)), Li-rich cathodes, or others have been developed for next-generation, high-energy Li-ion batteries. However, both Si-based anodes and high-voltage Ni-rich NCM (or NCA) or Lithium Cobalt Oxide ($LiCoO_2$) (LCO) cathodes face formidable technological challenges such as long-term cycling stability with high-Si anodes paired with NCM or NCA cathodes.

For anodes, Si-based materials can provide significant improvement in energy density. However, the large volumetric expansion (>300%) during the Li alloying/de-alloying processes can lead to disintegration of the active material and the loss of electrical conduction paths, thereby reducing the cycling life of the battery. In addition, an unstable solid electrolyte interphase (SEI) layer can develop on the surface of the cycled anodes. As the active material expands and contracts during each charge-discharge cycle, unreacted Si surfaces in the active material can subsequently be exposed to the liquid electrolyte and form thicker SEI layers. This results in an irreversible capacity loss at each cycle due to the reduction at the low potential where the liquid electrolyte reacts with the exposed unreacted surface of the Si in the anode. In addition, oxidative instability of the conventional non-aqueous electrolyte takes place at voltages beyond 4.5 V, which can lead to accelerated decay of cycling performance and severe gas generation.

For high capacity Ni-rich NCM (or NCA), Li-rich cathodes, in order to increase capacity and the energy density in full cells, a high cutoff voltage may be utilized. The high cutoff voltage increases lithium efficiency rate. However at the same time, the high cutoff voltage results in considerable gas evolution growth and Coulombic efficiency decrease for the cell due to the electrolyte oxidation on the surface of these cathodes or the atomic oxygen, which may be released from the cathode in the course of battery charge at high voltages. This is the reason for current values for cutoff voltage of around 4.3V. Nevertheless, even under this cutoff voltage, on both cathode and anode, gases may be released.

The majority of current electrolytes for Si anode-based Li-ion batteries are carbonate-based solutions with $LiPF_6$ salt dissolved in the mixture of cyclic alkyl carbonate (such as ethylene carbonate (EC), vinylene carbonate (VC), propylene carbonate (PC), di-fluoroethylene carbonate (DiFEC), trifluoropropylene carbonate (TFPC), etc.) and one or more linear carbonates (such as ethyl methyl carbonate (EMC), dimethyl carbonate (DMC), diethyl carbonate (DEC), etc.) with/without small amounts of additives. In recent years, fluoroethylene carbonate (FEC) has been frequently used as an additive, co-solvent, or even main solvent in the Si anode-based Li-ion batteries. However, high FEC-containing electrolyte formulation-based cells suffer from gas generation and volume swelling due to the decomposition of FEC phase upon prolonged cycling. In general, the gas evolution in the lithium-ion batteries is a serious problem; it is especially so in the case of their work under high voltages and temperatures. One of the primary gases generated is $CO_2$.

Traditional chemical pathways for reaction of $CO_2$ with primary, secondary, and tertiary amines as well as amidines and guanidines in aqueous media result in the formation of carbamates, carbonates, and bicarbonates. The electrophilic nature of the carbon atom in $CO_2$ makes it susceptible to nucleophilic attack by various N-, O-, and C donors, e.g., of amines, hydroxyl groups, and certain ionic liquids, respectively. Primary and secondary amines can act as a nucleophile (Lewis base) by direct attack on free $CO_2$ to form a zwitterion, which rapidly rearranges to carbamic acid via intramolecular proton transfer. In the presence of another free amine, which now acts as a Brønsted base, the carbamic acid may be converted into a carbamate via intermolecular proton transfer. Additionally, primary and secondary amines can form bicarbonate salts by deprotonation of carbonic acid or by hydrolysis of carbamate. However, these materials have not previously been used as electrolyte additives for Li-ion batteries to remove the generated $CO_2$ in the cells after cycling.

As described and illustrated herein, use of functional aliphatic and/or aromatic amine compounds including primary amines ($R'NH_2$), secondary amines ($R'R"NH$), secondary heterocyclic amines and derivatives thereof as electrolyte additives can provide reduction of gas (e.g. $CO_2$) in Li-ion batteries. In addition to reducing $CO_2$, these chemicals may help form a stable layer on the surface of the electrodes, which is important in the suppression of gas generation. This combination of the surface coating and electrolyte additive offers an effective solution to the gassing problem of Li-ion batteries. Additionally, the electrolyte additives disclosed herein can improve high temperature stability of batteries and the chemical reaction that reduces the $CO_2$ can result in reaction products that can be useful components of a battery.

As discussed above, battery swelling due to internal gas formation in cells can result in severe degradation of battery performance. Within a battery cell, evolved gas reduces the interfacial area between active material and electrolyte, and thus hinders the electrochemical reactions at the solid electrolyte interphase (SEI) or cathode electrolyte interphase (CEI) layers. Cell swelling occurring from gas generation results in the decomposition of the electrolyte and impedes the complex chemical reactions in the electrolyte that coincides with the SEI and CEI layer formation processes.

Gas generation behaviors are strongly dependent on electrolyte types and are also closely related to the electrodes used (especially cathodes). Gas evolution in Li-ion full cells can be more complicated than half ones, especially when graphite, Si, Sn, Sb, or transition metal oxide, etc., -based anodes are paired with different cathodes, such as Ni-rich NMC or NCA cathodes, Li-rich cathodes, or other high-voltage, high-capacity cathodes. For electrolyte formulations in $LiPF_6$ in cyclic carbonates (e.g. FEC, EC, VC, PC, TFPC, etc.) and linear carbonates (e.g. EMC, DEC, DMC, etc.)-based Li-ion full cells with the aforementioned different anodes and cathodes, the main gaseous byproduct formed by the decomposition of cyclic carbonates and/or accompanying SEI and CEI layer formation on the surface of the electrodes is $CO_2$. In order to reduce cell swelling and prevent performance degradation in current Li-ion batteries, $CO_2$ formed in cells needs to be reduced or eliminated.

The present application describes overcoming the problem of excess gas generation in Li-ion batteries by using various classes of amines as electrolyte additives to react with the generated $CO_2$. These additives serve to reduce gases in Li-ion batteries, preferably Si-dominant anode-based Li-ion batteries. Examples of amines include primary amines ($R'NH_2$), secondary amines (R'R"NH), secondary heterocyclic amines and derivatives thereof, further described, but not limited to, the following.

In accordance with the disclosure, functional silazane compounds containing secondary amine (—NH) groups can be used as electrolyte additives to reduce gases in Li-ion batteries. An example silazane is 2,4,6-Trimethyl-2,4,6-trivinylcyclotrisilazane (TriMTVCTS):

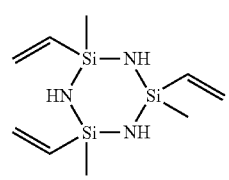

2,4,6-Trimethyl-2,4,6-trivinylcyclotrisilazane (TriMTVCTS)
(2,4,6-tris(ethenyl)-2,4,6-trimethyl-1,3,5,2,4,6-triazatrisilinane)

In accordance with the disclosure, functional phosphazene compounds containing secondary amine (—NH) groups can be used as electrolyte additives to reduce gases in Li-ion batteries. Examples include Hexakis(allylamino) cyclotriphosphazene (HALCPZ) and Hexakis(4-aminophenoxy) cyclotriphosphazene. Example phosphazene molecular structures are shown below:

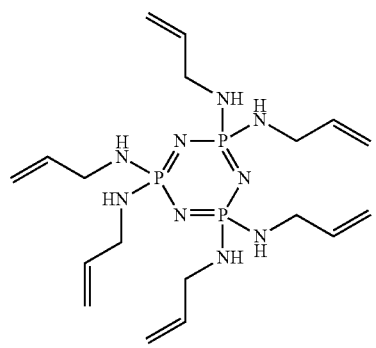

Hexakis(allyamino)cyclotriphosphazene (HALCPZ)
(2,2,4,4,6,6-Hexakis(allyamino)-1,3,5,2,4,6-triazatriphosphorine)

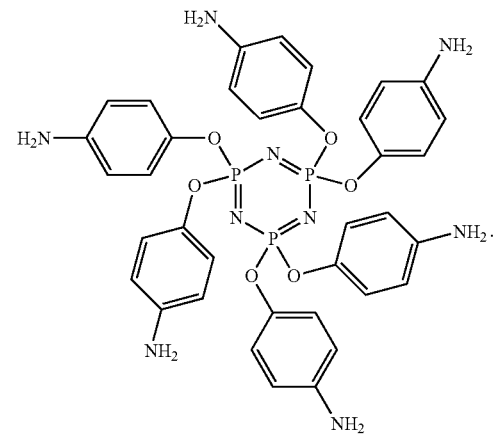

Hexakis(4-aminophenoxy)cyclotriphosphazene

In accordance with the disclosure, functional silane compounds containing primary amines ($R'NH_2$), secondary amines (R'R"NH), or secondary cyclic amines may be used as electrolyte additives to reduce gases in Li-ion batteries. These compounds include, but are not limited to, N1-(3-Trimethoxysilylpropyl)diethylenetriamine (TMSPETA); Aminopropyl Triethoxysilane (APTES); 3-Aminopropylmethyldiethoxysilane; [3-(2-Aminoethylamino)propyl] trimethoxysilane (AEAPTMS); N-(3-Triethoxysilylpropyl) ethylenediamine; (3-Aminopropyl)trimethoxysilane (APTMS); 3-(Dimethoxymethylsilyl) propylamine; N-[3-(Trimethoxysilyl)propyl]cyclohexanamine; (N-Phenylaminomethyl) methyldimethoxysilane; Anilino-methyl-triethoxysilane; Bis(trimethoxysilylpropyl)amine; Bis(3-triethoxysilylpropyl)amine; N-(n-butyl)-3-aminopropyltrimethoxysilane; N-Phenylaminopropyltrimethoxysilane; N-(6-Aminohexyl) aminomethyltrimethoxysilane, etc. Example silane molecular structures are shown below:

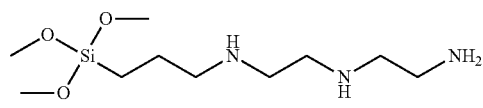

N1-(3-Trimethoxysilylpropyl)diethylenetriamine (TMSPETA)

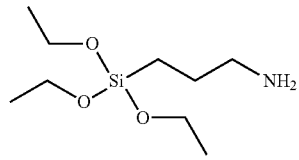

Aminopropyl Triethoxysilane (APTES)

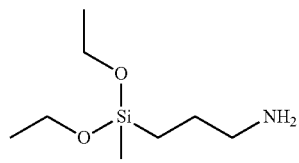

3-Aminopropylmethyldiethoxysilane

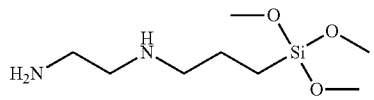

[3-(2-Aminoethylamino)propyl]trimethoxysilane (AEAPTMS)

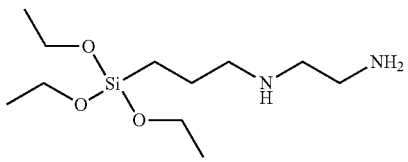

N-(3-Triethoxysilylpropyl)ethylenediamine

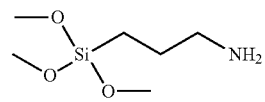

(3-Aminopropyl)trimethoxysilane (APTMS)

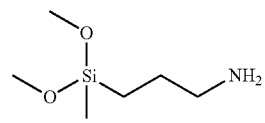

3-(Dimethoxymethylsilyl)propylamine

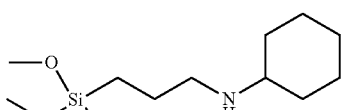

N-[3-(Trimethoxysilyl)propyl]cyclohexanamine

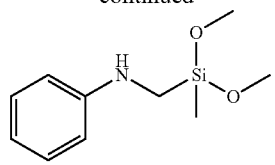

(N-Phenylaminomethyl)Methyldimethoxysilane

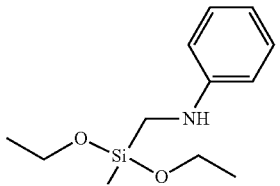

Anilino-methyl-triethoxysilane

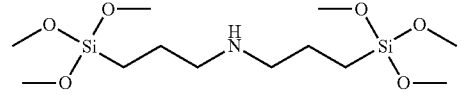

Bis(trimethoxysilylpropyl)amine

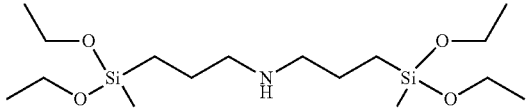

Bis(3-triethoxysilylpropyl)amine

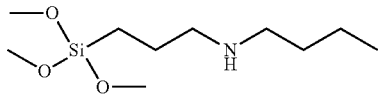

N-(n-butyl)-3-aminopropyltrimethoxysilane

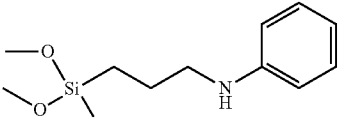

N-Phenylaminopropyltrimethoxysilane
(N-[3-(trimethoxysilyl)propyl]aniline

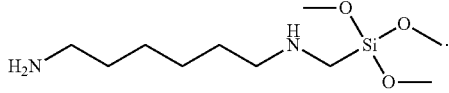

N-(6-Aminohexyl)Aminomethyltrimethoxysilane

In accordance with the disclosure, functional organic carbamate compounds may be used as electrolyte additives to reduce gases in Li-ion batteries. A general carbamate structure (I) is shown below:

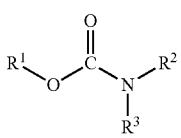

(I) General structure of functional organic carbamates.

These carbamate compounds contain at least a nitrogen atom attached to a —O—C=O— group, thus having the structure $R^1$—OCO—$NR^2R^3$. In these compounds, one of R² or R³ is H, the other may be an organic functional group such as —CN, —NH, —NH2, alkenyl, heteroalkenyl, alkynyl, heteroalkynyl, or alkyl; optionally substituted by —F, —CN, —CF3 or heterocycloalkyl, cycloalkyl, heterocycloalkyl, etc. R¹ can be an organic functional group as described above. Some of these modifications may also include the use of alkyl substituents, aromatic sub-cyclic units, nitrogen, silicon, and/or sulfur atoms substituted for oxygen in the macrocyclic ring and other changes or combinations thereof which provide the compounds with unique SEI or CEI formation properties or good compatibility with electrolyte solutions. Suitable carbamates include, but are not limited to, 2,5-Pyrrolidinedione, 1-[[(cyclohexylamino)carbonyl]oxy]-; N-Allylcarbamic acid 2-(carbamoyloxymethyl)-2,3-dimethylpentyl ester; N-Allylcarbamic acid 2-(carbamoyloxymethyl)-2-ethylbutyl ester; N(alpha)-(N,N-dimethylcarbamoyl)-alpha-azaornithine phenyl ester, etc. Example carbamate molecular structures are shown below:

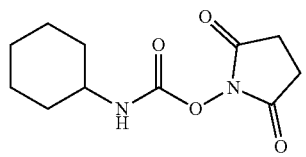

2,5-Pyrrolidinedion, 1-[[(cyclohexylamino)carbonyl]oxy]-

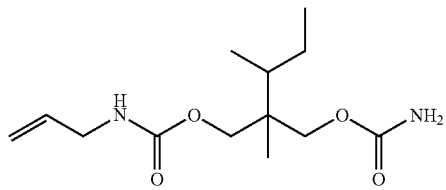

N-Allylcarbamic acid 2-(carbamoyloxymethyl)-2,3-dimethylpentyl ester

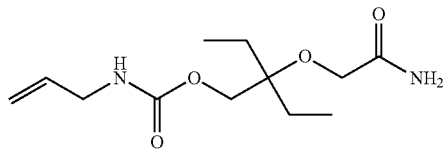

N-Allylcarbamic acid 2-(carbamoyloxymethyl)-2-ethylbutyl ester

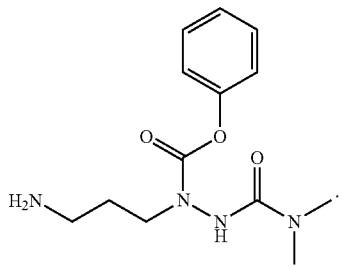

N(alpha)-(N,N-dimethylcarbamoyl)-alpha-azaornithine phenyl ester

In accordance with the disclosure, functional organic imide compounds are used as electrolyte additives to reduce gases in Li-ion batteries. An imide is a functional group consisting of two acyl groups bound to nitrogen. A general imide structure (II) is shown below:

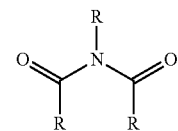

(II) General structure of functional organic imides.

In these compounds, the R bound to nitrogen may be H. Other R groups may be an organic functional group such as —CN, —NH, —NH2, alkenyl, heteroalkenyl, alkynyl, heteroalkynyl, alkyl optionally substituted by —F, —CN, —CF₃ or heterocycloalkyl, cycloalkyl, heterocycloalkyl, etc. Some of these modifications may also include the use of alkyl substituents, aromatic sub-cyclic units, nitrogen, silicon, and/or sulfur atoms substituted for oxygen in the macrocyclic ring and other changes or combinations thereof which provide the compounds with unique SEI or CEI formation properties or good compatibility with electrolyte solutions. Suitable imides include but are not limited to succinimide; maleimide; glutarimide; phthalimide; thalidomide; etc. Example imide molecular structures are shown below:

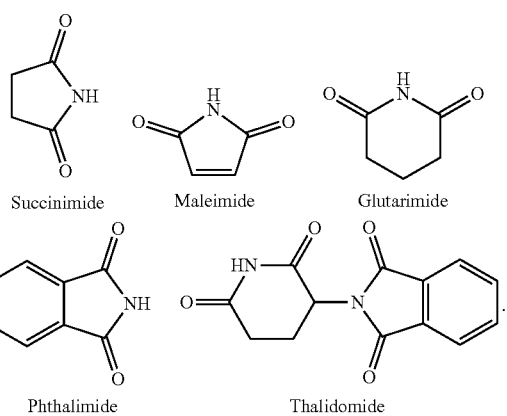

Succinimide    Maleimide    Glutarimide

Phthalimide    Thalidomide

In accordance with the disclosure, functional organic amide compounds (or carboxamides) may be used as electrolyte additives to reduce gases in Li-ion batteries. A general amide structure (III) is shown below:

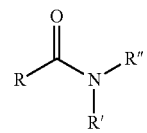

(III) General structure of functional organic amide compounds (or carboxamides).

These compounds contain at least a nitrogen atom attached to a carbonyl group, thus having the structure R—CO—NR'R". Among them, one of R' or R" is H, the other one is an organic functional group such as —CN, —NH, —NH₂, alkenyl, heteroalkenyl, alkynyl, heteroalkynyl, alkyl optionally substituted by —F, —CN, —CF$_3$ or heterocycloalkyl, cycloalkyl, heterocycloalkyl, etc. Some of these modifications may also include the use of alkyl substituents, aromatic sub-cyclic units, nitrogen, silicon, and/or sulfur atoms substituted for oxygen in the macrocyclic ring and other changes or combinations thereof which provide the compounds with unique SEI or CEI formation properties or good compatibility with electrolyte solutions. Suitable amides include, but are not limited to, N-allyl-2-{[(4-ethylphenoxy)acetyl]amino}benzamide; N-allyl-1-(methylsulfonyl)-4-piperidinecarboxamide; N-allylacetamide; N-allyl-2-cyano-acetamide, etc. Example amide molecular structures are shown below:

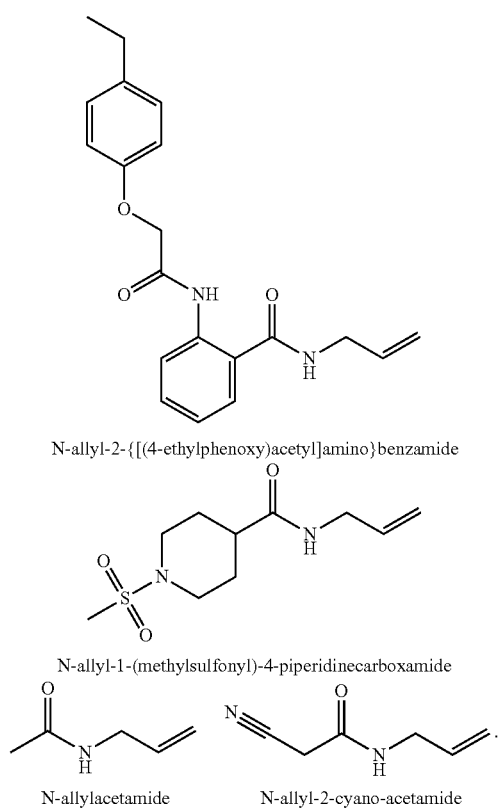

Also contemplated are tertiary amide compounds which have the general structure R—CO—NR'R", where the nitrogen is attached to three carbon containing substituents, that is, each of R, R' and R" are bonded to a carbon (i.e. none of R, R' or R" are H).

In accordance with the disclosure, functional compounds containing sulfonamide groups are used as electrolyte additives to reduce gases in Li-ion batteries. A general sulfonamide structure (IV) for these compounds is shown below:

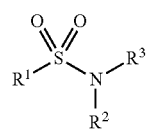

(IV) General structure of functional sulfonamide compounds.

R$^1$ can be an organic functional group such as —CN, —NH, —NH$_2$, alkenyl, heteroalkenyl, alkynyl, heteroalkynyl, alkyl optionally substituted by —F, —CN, —CF$_3$ or heterocycloalkyl, cycloalkyl, heterocycloalkyl, etc. Some of these modifications may also include the use of alkyl substituents, aromatic sub-cyclic units, nitrogen, silicon, and/or sulfur atoms substituted for oxygen in the macrocyclic ring and other changes or combinations thereof which provide the compounds with unique SEI or CEI formation properties or good compatibility with electrolyte solutions. At least one of R$^2$ or R$^3$ is H, the other one can be a functional group as discussed above. Suitable sulfonamides include, but are not limited to, N-Allyllmethanesulfonamide; N-Allylbenzenesulfonamide; N-Allyl-4-isothiocyanatobenzenesulfonamide; N-{4-[(allylamino)sulfonyl]phenyl}benzamide; N-allyl-2-[(methylsulfonyl)amino]benzamide; N-(3-aminopropyl)-N-methylethane-1-sulfonamide; 1-(Phenylmethane)sulfonylpiperidin-3-amine; N-(4-{[(1-allyl-1-phenyl-3-butenyl)amino]sulfonyl}phenyl)acetamide; N-allyl-2-{[(4-fluorophenyl)sulfonyl]amino}acetamide; N-{4-[(allylamino)sulfonyl]phenyl}-2-methoxybenzamide, etc. Example sulfonamide molecular structures are shown below:

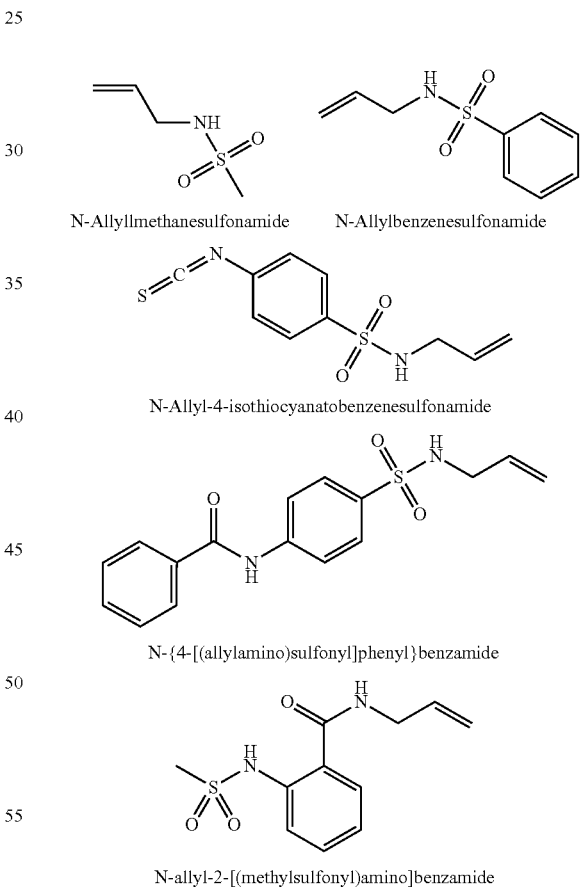

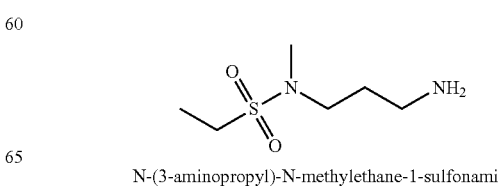

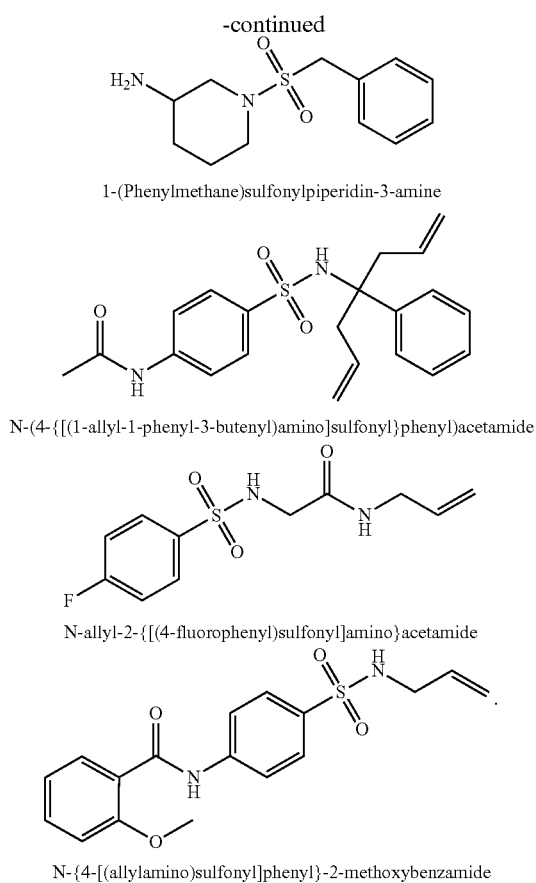

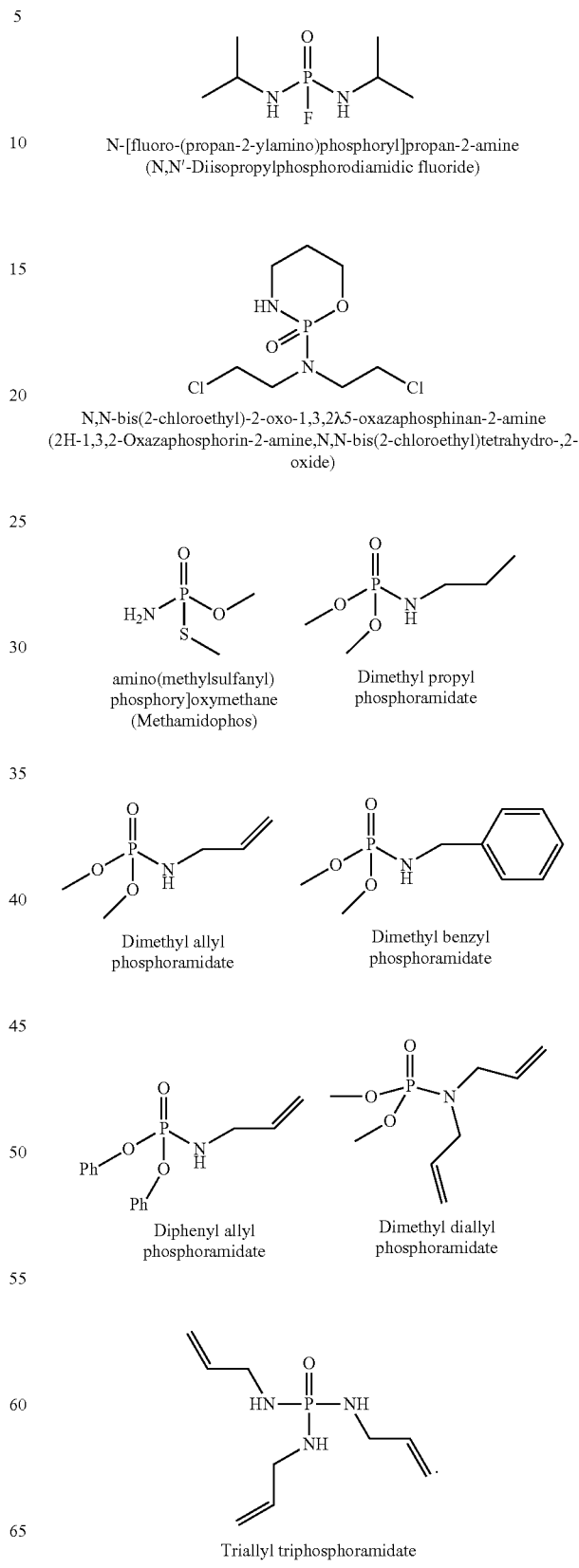

In accordance with the disclosure, functional phosphoramide compounds may be used as electrolyte additives to reduce gases in Li-ion batteries. A general phosphoramide structure (V) for these compounds is shown below:

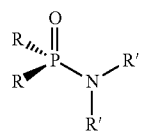

(V) General structure of functional phosphoramide compounds.

Among them, one of R' groups may be H. The other R' and R may be an organic functional group such as —CN, —NH, —NH$_2$, alkenyl, heteroalkenyl, alkynyl, heteroalkynyl, alkyl optionally substituted by —F, —CN, —CF$_3$ or heterocycloalkyl, cycloalkyl, heterocycloalkyl, etc. Some of these modifications may also include the use of alkyl substituents, aromatic sub-cyclic units, nitrogen, silicon, and/or sulfur atoms substituted for oxygen in the macrocyclic ring and other changes or combinations thereof which provide the compounds with unique SEI or CEI formation properties or good compatibility with electrolyte solutions. Suitable phosphoramides include, but are not limited to, N-[fluoro-(propan-2-ylamino)phosphoryl]propan-2-amine; N,N-bis(2-chloroethyl)-2-oxo-1,3,2λ$^5$-oxazaphosphinan-2-amine; [amino(methylsulfanyl)phosphoryl]oxymethane; Dimethyl propyl phosphoramidate; Dimethyl allyl phosphoramidate; Dimethyl benzyl phosphoramidate; Diphenyl allyl phosphoramidate; Dimethyl diallyl phosphoramidate; Triallyl triphosphoramidate, etc. Example phosphoramide molecular structures are shown below:

In accordance with the disclosure, functional guanidine compounds may be used as electrolyte additives to reduce gases in Li-ion batteries. A general guanidine structure (VI) for these compounds is shown below:

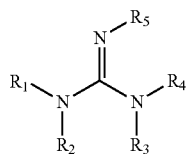

(VI) General structure of functional guanidine compounds.

Among them, one of the R groups may be H. The other R groups may be H or different organic functional groups such as, such as —CN, —NH, —$NH_2$, alkenyl, heteroalkenyl, alkynyl, heteroalkynyl, alkyl optionally substituted by —F, —CN, —$CF_3$ or heterocycloalkyl, cycloalkyl, heterocycloalkyl, etc. Some of these modifications may also include the use of alkyl substituents, aromatic sub-cyclic units, nitrogen, silicon, and/or sulfur atoms substituted for oxygen in the macrocyclic ring and other changes or combinations thereof which provide the compounds with unique SEI or CEI formation properties or good compatibility with electrolyte solutions. Suitable guanidines include, but are not limited to, N-Butyl-N',N''-diisopropylguanidine; 1,3-Di-BOC-2-trifluoromethylsulfonyl)guanidine; N,Nμ,Nμμ-Tri-Boc-guanidine; 1,2,3-Triphenylguanidine; Guanidine carbonate; Guanidine thiocyanate, etc. Example guanidine molecular structures are shown below:

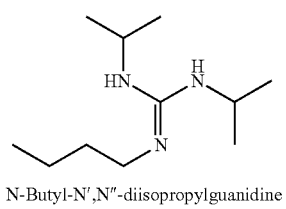

N-Butyl-N',N''-diisopropylguanidine

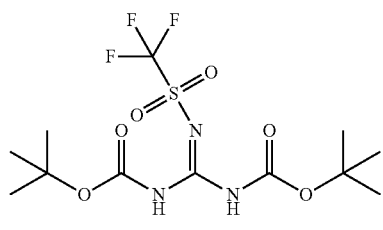

1,3-Di-BOC-2-trifluoromethylsulfonyl)guanidine

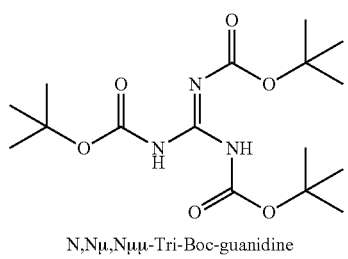

N,Nμ,Nμμ-Tri-Boc-guanidine

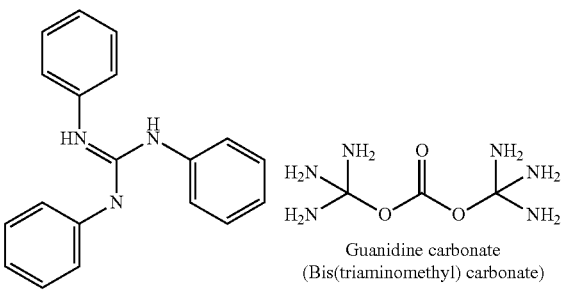

1,2,3-Triphenylguanidine

Guanidine carbonate (Bis(triaminomethyl) carbonate)

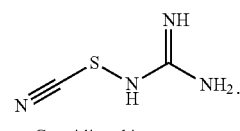

Guanidine thiocyanate

In accordance with the disclosure, functional organic compounds containing urea groups or thiourea groups, or other similar structures can be used as electrolyte additives to reduce gases in Li-ion batteries. Suitable compounds include, but are not limited to, N-[4-(allyloxy)phenyl]-N'-cyclohexylurea; N-Allyl-N'-(2-cyanophenyl)urea; 1-cyclopentyl-3-prop-2-enylthiourea; N-allyl-N'-(2-fluorophenyl)thiourea; N-Allyldithiocarbamic acid phenyl ester; N-allyl-2-(2-methoxybenzoyl) hydrazinecarbothioamide, etc. Example molecular structures are shown below:

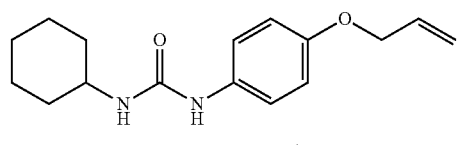

N-[4-(allyloxy)phenyl]-N'-cyclohexylurea

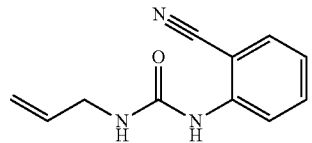

N-Allyl-N'-(2-cyanophenyl)urea

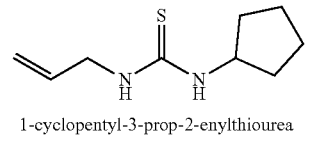

1-cyclopentyl-3-prop-2-enylthiourea

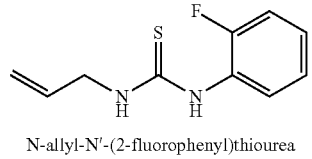

N-allyl-N'-(2-fluorophenyl)thiourea

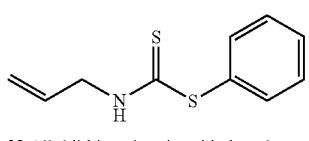

N-Allyldithiocarbamic acid phenyl ester

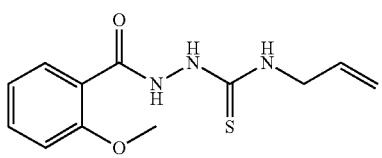

N-allyl-2-(2-methoxybenzoyl)hydrazinecarbothioamide

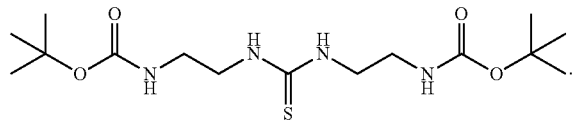

Di-tert-butyl((thiocarbonylbis(azanediyl))bis(ethane-2,1-diyl))dicarbamate

In accordance with the disclosure, secondary heterocyclic amine compounds and their derivatives may be used as electrolyte additives to reduce gas generations in Li-ion batteries. Suitable compounds include, but are not limited to, 7-(trifluoromethyl)-1,2,3,4-tetrahydroquinoline; 2-methyl-7-(trifluoromethyl)-4H,5H,6H,7H-pyrazolo[1,5-a]pyrimidine; 1-(2,2,2-trifluoroethyl)piperazine; 5-(trifluoromethyl)-1,4-diazepane; 1-(2,2,2-trifluoroethyl)-1,4-diazepane; 5-(trifluoromethyl)piperidin-2-one; etc. Example molecular structures are shown below:

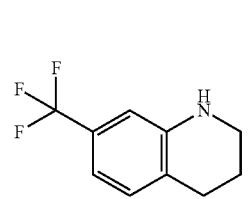
7-(trifluoromethyl)-
1,2,3,4-tertrahydroquinoline

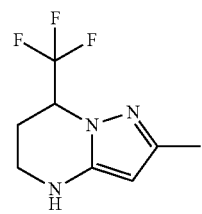
2-methyl-7-(trifluoromethyl)-
4H,5H,6H,7H,-pyrazolo
[1,5-a]pyrimidine

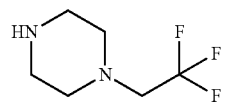
1-(2,2,2-trifluoroethyl)
piperazine

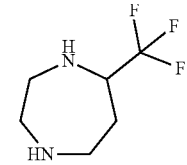
5-(trifluoromethyl)-
1,4-diazapane

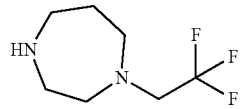
1-(2,2,2-trifluoroethyl)-1,4-
diazepane

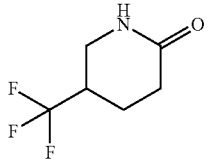
5-(trifluoromethyl)piperidin-2-one

In accordance with the disclosure, Phthalocyanine or Porphyrin compounds containing —NH groups may be used as electrolyte additives to reduce gases in Li-ion batteries. Suitable compounds include, but are not limited to, Phthalocyanine; Porphyrin; 5,15-Diphenyl-21H,23H-porphine; 2,3,7,8,12,13,17,18-Octafluoro-5,10,15,20-tetrakis(pentafluorophenyl) porphyrin; 2,3,7,8,12,13,17,18-Octaethylporphyrin, etc. Example molecular structures are shown below:

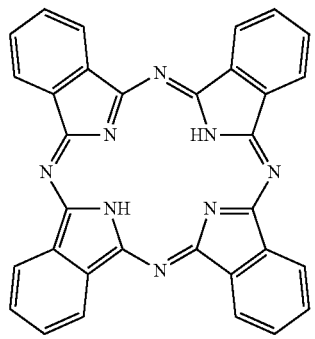

Phthalocyanine

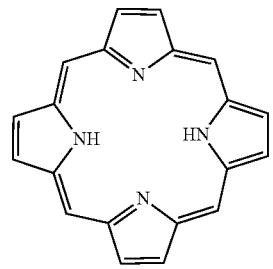

Porphyrin

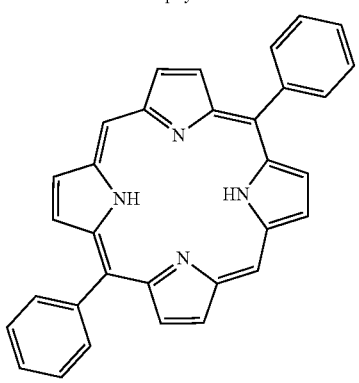

5,15-Diphenyl-21 H,23H-porphine

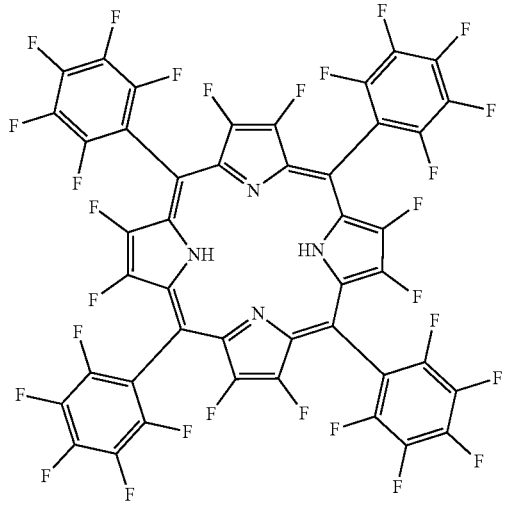

2,3,7,8,12,13,17,18-Octafluoro-5,10,15,20-
tetrakis(pentafluorophenyl)porphyrin

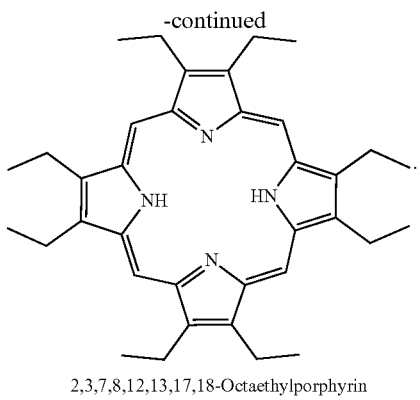

2,3,7,8,12,13,17,18-Octaethylporphyrin

In a further embodiment, an ionic liquid (IL) can be used as an electrolyte additive to reduce gases in Si-dominant anode-based Li-ion batteries because of their inherent structure tunability, good affinity with $CO_2$, and nonvolatility. These IL may include, but are not limited to 1-Butyl-3-methylimidazolium hexafluorophosphate ($BMIM-PF_6$), 1-butyl-3-propylamineimidazolium tetrafluoroborate, 1-ethyl-3-methylimidazolium (EMIM), etc.

The functional aliphatic and/or aromatic amine compounds of the disclosure may be combined with a solvent to produce amine compound-based solutions that are then used in electrode production. The solvents used can be monoethanolamine (MEA), Dimethylacetamide (DMAc or DMA), DI water, alcohol, etc.

As described herein, functional aliphatic and/or aromatic amine compounds can be used as electrolyte additives to reduce gases in all anode-based Li-ion batteries, including Si anode-based and directly coated Si-dominant anodes. In one embodiment, the electrolyte additives may be used to reduce gases in graphite (carbon) anode-based Li-ion batteries, including hard/soft carbon. In another embodiment, the electrolyte additives may be used to reduce gases in all other anode-based Li-ion batteries. These anodes may be Sn, Sb, P, transition metal oxides, etc.

In one embodiment, functional aliphatic and/or aromatic amine compounds may be used as electrolyte additives to reduce gases in batteries having various cathode types. One cathode type may be NCM (NMC) materials which are Lithium Nickel Manganese Cobalt Oxide materials having the general formula: $LiNi_xMn_yCo_zO_2$. NMC (Ni—Mn—Co) cathodes with different Ni—Mn—Co compositions include but are not limited to 9 0.5 0.5, 811, 622, 532, 442, 333, where the numbers represent the amounts (e.g. percentage) of Ni, Mn and Co respectively; example: $LiNi_{0.5}Mn_{0.3}Co_{0.2}O_2$, Ni:Mn:Co=5:3:2=NMC 532. The cathodes can be the Ni-rich NCM 9 0.5 0.5, 811, 622, 532, 442, 333 materials described above, and also quaternary systems consisting of Ni, Co, Mn and Al together, e.g. $Li[Ni_pCo_qMn_rAl_s]O_2$ (p+q+r+s=1) (NCMA); Lithium Nickel Cobalt Aluminium Oxide ($LiNiCoAlO_2$; NCA); Lithium Manganese Oxide ($LiMn_2O_4$; LMO); Lithium Cobalt Oxide ($LiCoO_2$; LCO); lithium rich, $xLi_2MnO_3 \cdot (1-x)LiNi_aCo_bMn_cO_2$ cathodes; nickel-rich layered oxides ($LiNi_{1-x}M_xO_2$, M=Co, Mn and Al); lithium rich layered oxides ($LiNi_{1+x}M_{1-x}O_2$, M=Co, Mn and Ni); high-voltage spinel oxides ($LiNi_{0.5}Mn_{1.5}O_4$); or high-voltage polyanionic compounds (phosphates, sulfates, silicates, etc.), etc.

In an example embodiment of the disclosure, a method is described for making batteries such as Li-ion batteries where the electrode(s) (e.g. cathode, anode or both) contain functional aliphatic and/or aromatic amine compounds as electrolyte additives to reduce gas generation. To create electrodes, the amine compounds are added either while the electrode is made, or after formation of the electrode. In one embodiment, functional aliphatic and/or aromatic amine compounds (or derivatives thereof) are incorporated into said cathode, anode or both by including the compounds in an electrode material slurry. In a further embodiment, Si anodes are made by adding the amine compound into the Si slurry when creating the additive-containing Si anodes.

In another embodiment, Si powders may be soaked in the amine compound-based solutions and coated on the surface of the Si anodes to prepare different Si anode-based Li-ion batteries. Alternatively, a Si anode may be soaked directly in the amine compound-based solution.

In an additional embodiment, Si cathodes may be made by adding the amine compound into the cathode slurry when creating the additive-containing cathodes. The cathodes can be Ni-rich NCM 9 0.5 0.5, 811, 622, 532, 442, 333, NCA, NCMA, LMO, LCO, lithium rich, $xLi_2MnO_3 \cdot (1-x)LiNi_aCo_bMn_cO_2$ cathodes, nickel-rich layered oxides ($LiNi_{1-x}M_xO_2$, M=Co, Mn and Al), lithium rich layered oxides ($LiNi_{1+x}M_{1-x}O_2$, M=Co, Mn and Ni), high-voltage spinel oxides ($LiNi_{0.5}Mn_{1.5}O_4$), high-voltage polyanionic compounds (phosphates, sulfates, silicates, etc.), etc. In a further embodiment, different cathode powders, or different cathodes are soaked in the amine compound-based solutions to coat these materials on the surface of the cathode.

In an additional embodiment, the amine compound-based solutions may be used to treat separators to fabricate different types of functional separators for Li-ion or Li-metal batteries.

Example 1: (3-Aminopropyl)trimethoxysilane (APTMS)

1 wt % (3-Aminopropyl)trimethoxysilane (APTMS) may be used as an electrolyte additive and added into 1.2 M $LiPF_6$ in FEC/EMC (3/7 wt %)-base reference electrolytes; Si-dominant anode//NCA cathode full pouch cells may be built accordingly. These cells may be tested using a 1 C/0.5 C charge/discharge cycle regime with the working voltage window of 4.2V to 3.1V at both 25° C. and 60° C., respectively. In further experiments, 1.5 wt % AMTMS may be used as an electrolyte additive and added into 1.2 M $LiPF_6$ in FEC/EMC (3/7 wt %)-base reference electrolytes; Si-dominant anode//NCA cathode full pouch cells may be built accordingly. The 60° C. storage test without clamping may be carried out and the corresponding OCV, impedance & thickness may be measured every 1 week for 4 weeks.

Figure 2A:
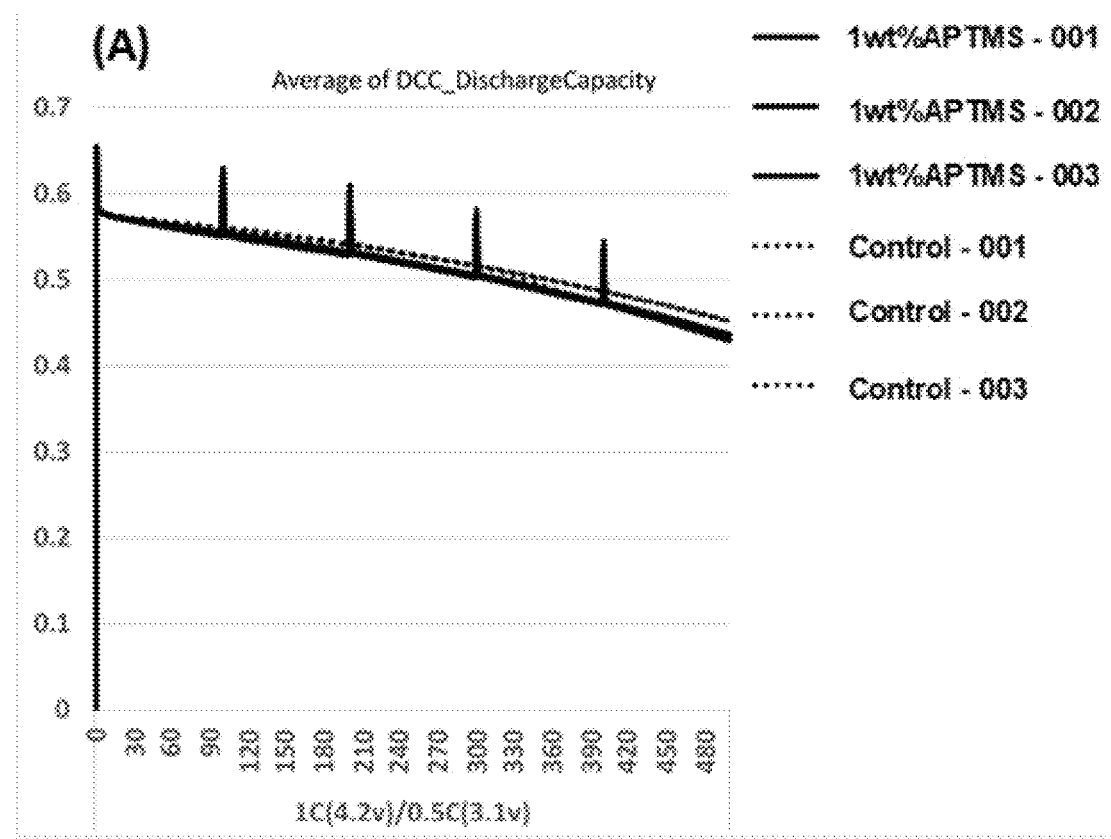
FIGS. 2A and 2B show the capacity retention (FIG. 2A) and normalized capacity retention (FIG. 2B) of Si-dominant anode//NCA cathode pouch full cells tested at 25° C. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % APTMS, in accordance with an example embodiment of the disclosure.
Figure 2B:
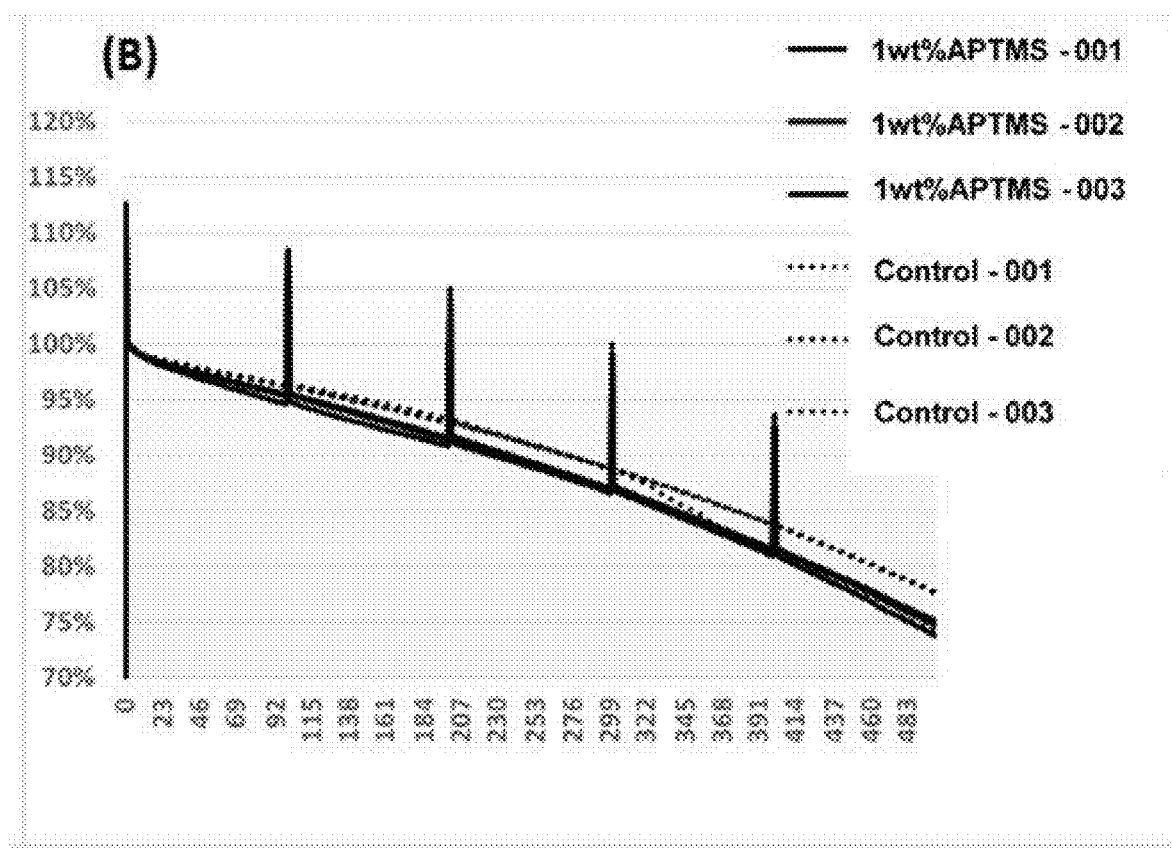

FIG. 2 demonstrates the capacity retention (A) and normalized capacity retention (B) of Si-dominant anode//NCA cathode pouch full cells. The electrolytes may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % APTMS. The Si-dominant anodes contain about 80 wt % Si, 5 wt % graphite and 15 wt % glassy carbon (from resin) and are laminated on 15 μm Cu foil. The average loading is about 2-5 mg/cm². The cathodes contain about 92 wt % NCA, 4 wt % Super P and 4 wt % PVDF5130, and are coated on 15 μm Al foil. The average loading is about 20-30 mg/cm². These cells may be tested at 25° C.

The long-term cycling program for both control and the 1 wt % APTMS-containing electrolyte-based pouch full cells include: (i) At the $1^{st}$ cycle, charge at 0.33 C to 4.2 V until 0.05 C, rest 5 minutes, discharge at 0.33 C to 3.1 V, rest 5 minutes; and (ii) from the $2^{nd}$ cycle, charge at 1 C to 4.2 V until 0.05 C, rest 5 minutes, discharge at 0.5 C to 3.1 V, rest 5 minutes. After every 100 cycles, the test conditions in the $1^{st}$ cycle may be repeated.

As demonstrated by the data in FIG. 2, 1 wt % APTMS-containing electrolyte-based pouch full cells have similar cycle performance with reference electrolyte-based control cells when tested with 1 C(4.2V)/0.5 C(3.1V) at 25° C.

Figure 3A:
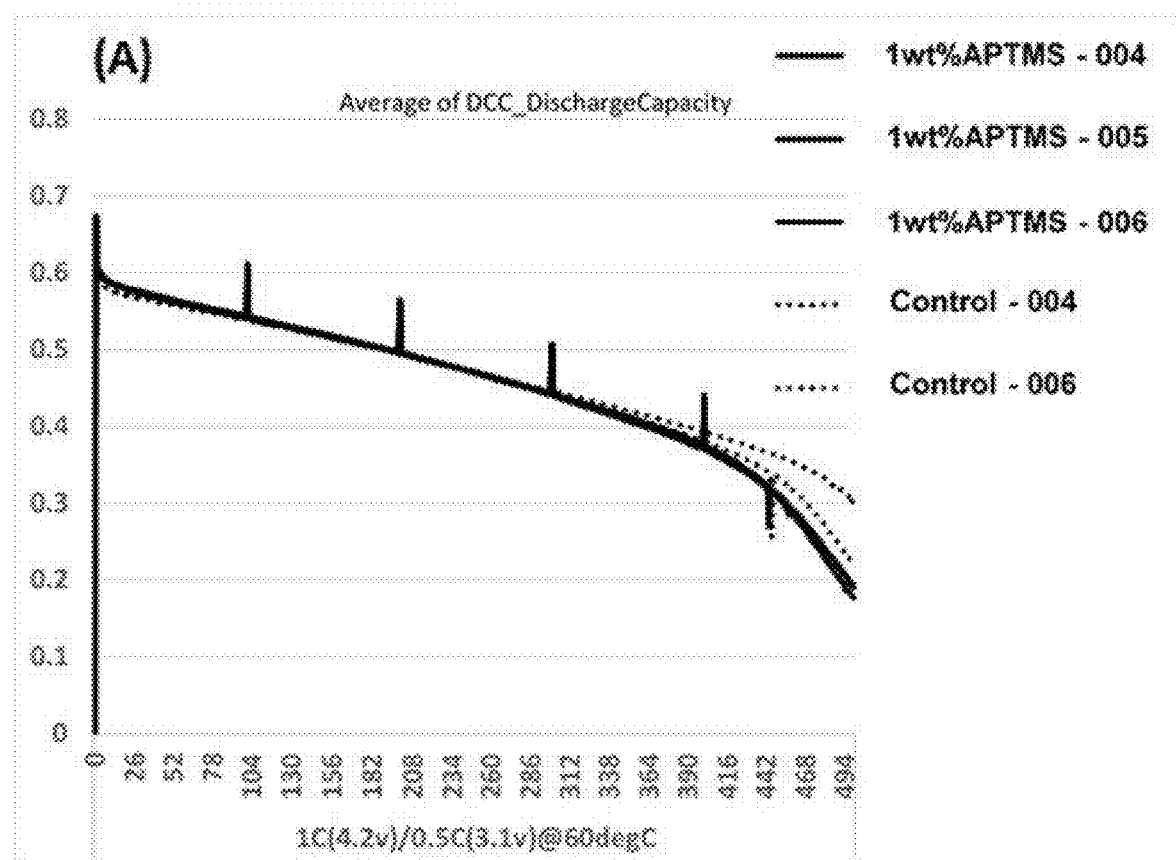
FIGS. 3A and 3B show the capacity retention (FIG. 2A) and normalized capacity retention (FIG. 3B) of Si-dominant anode//NCA cathode pouch full cells tested at 60° C. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % APTMS, in accordance with an example embodiment of the disclosure.
Figure 3B:
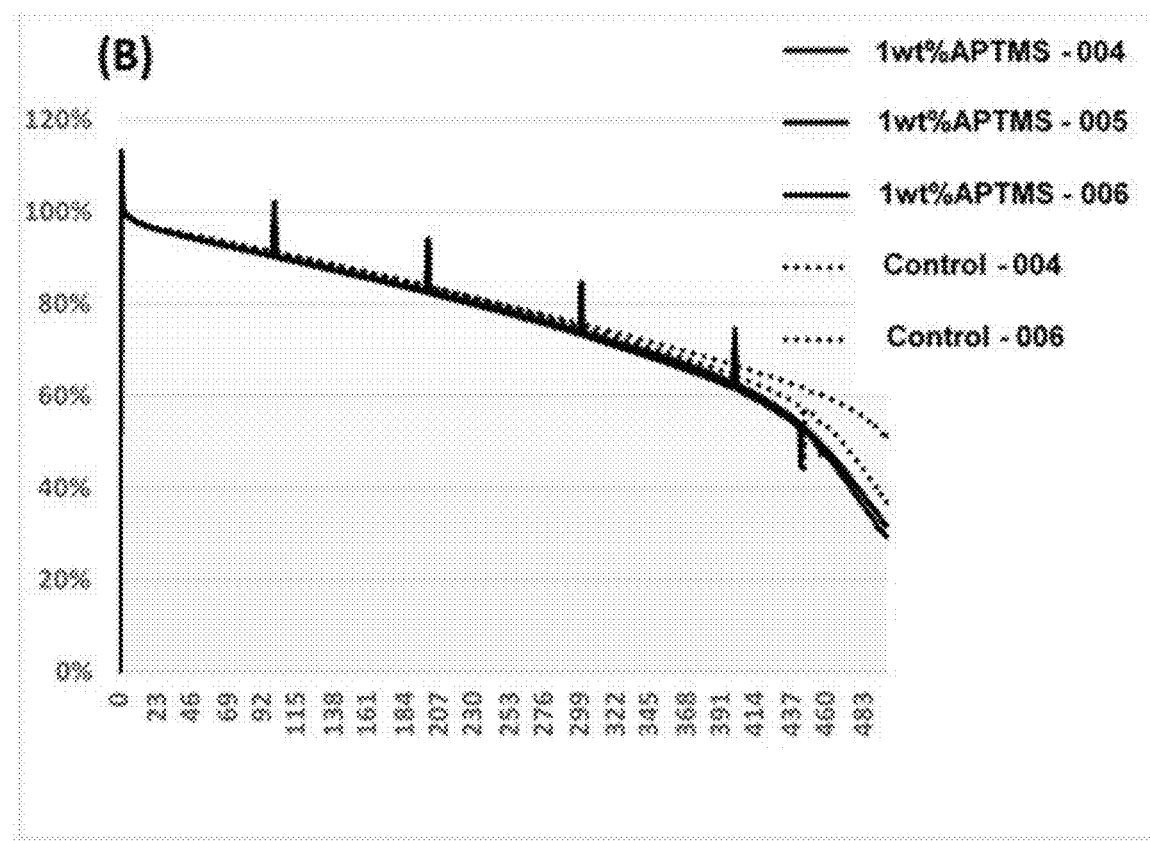

FIG. 3 demonstrates the capacity retention (A) and normalized capacity retention (B) normalized capacity retention of Si-dominant anode//NCA cathode pouch full cells. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % APTMS. The Si-dominant anodes contain about 80 wt % Si, 5 wt % graphite and 15 wt % glassy carbon (from resin) and are laminated on 15 μm Cu foil. The average loading is about 2-5 mg/cm². The cathodes contain about 92 wt % NCA, 4 wt % Super P and 4 wt % PVDF5130, and are coated on 15 μm Al foil. The average loading is about 20-30 mg/cm². These cells may be tested at 60° C.

The long-term cycling program for both control and the 1 wt % APTMS-containing electrolyte-based pouch full cells are the same as described above for FIG. 2.

As demonstrated by the data in FIG. 3, 1 wt % APTMS-containing electrolyte-based pouch full cells have similar cycle performance with reference electrolyte-based control cells when tested with 1 C(4.2V)/0.5 C(3.1V) at 60° C.

Figure 4:
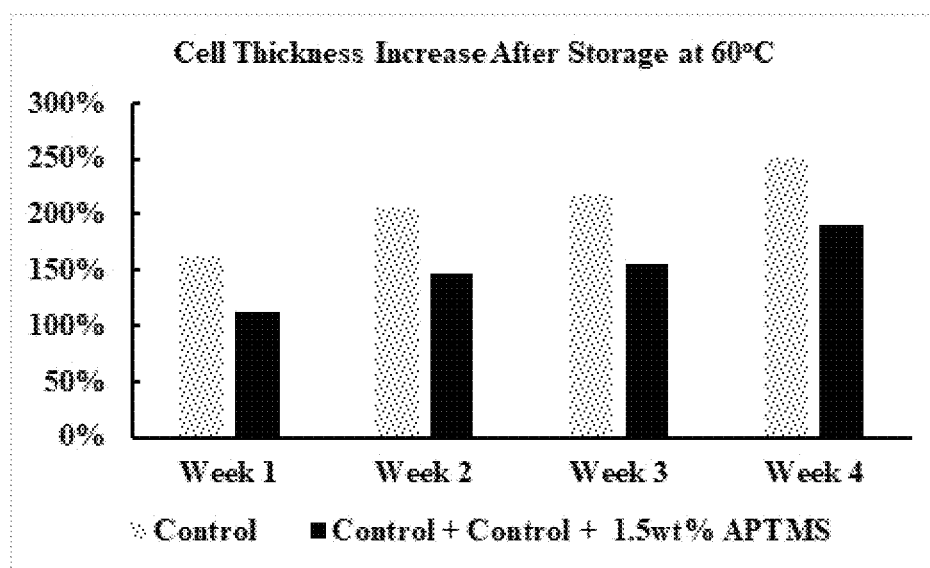
FIG. 4 illustrates Si-dominant anode//NCA cathode pouch full cells thickness measurement after 60° C. storage tests. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1.5 wt % APTMS, in accordance with an example embodiment of the disclosure.

FIG. 4 shows Si-dominant anode//NCA cathode pouch full cells thickness measurement after 60° C. storage tests. The electrolytes may be: (dotted line) 1.2 M $LiPF_6$ in FEC/EMC (3/7 wt %)—Control, (thick solid line) 1.2 M $LiPF_6$ in FEC/EMC (3/7 wt %)+1.5 wt % APTMS. The Si-dominant anodes contain about 80 wt % Si, 5 wt % graphite and 15 wt % glassy carbon (from resin) and may be laminated on 15 μm Cu foil. The average loading is about 2-5 mg/cm². The cathodes contain about 92 wt % NCA, 4 wt % Super P and 4 wt % PVDF5130, and are coated on 15 μm Al foil. The average loading is about 15-25 mg/cm².

The 60° C. storage test without clamping for both control and the 1.5 wt % APTMS-containing electrolyte-based pouch full cells is shown in FIG. 4. Method: 1 C Charge to 4.2V until C/20. Rest for 30 minutes, Measure OCV, impedance & thickness, Store the cells at 60° C., Measure OCV, Impedance & Thickness every 1 week for 4 weeks. The chart in FIG. 4 illustrates that 1.5 wt % APTMS-containing electrolyte-based pouch full cells have less thickness increase compared with the reference electrolyte-based control cells after 60° C. storage test without clamping with different time of 1, 2, 3, or 4 weeks.

Figure 5:
FIG. 5. is a photo of Si-dominant anode//NCA cathode pouch full cells after the 60° C. storage test without clamping for 4 weeks. The electrolytes used may be: (top) 1.2 M $LiPF_6$ in FEC/EMC (3/7 wt %)—Control, (bottom) 1.2 M $LiPF_6$ in FEC/EMC (3/7 wt %)+1.5 wt % APTMS, in accordance with an example embodiment of the disclosure.

FIG. 5 is a photo of Si-dominant anode//NCA cathode pouch full cells after the 60° C. storage test without clamping for 4 weeks. The electrolytes used are: (top) 1.2 M $LiPF_6$ in FEC/EMC (3/7 wt %)—Control, (bottom) 1.2 M $LiPF_6$ in FEC/EMC (3/7 wt %)+1.5 wt % APTMS. The Si-dominant anodes contain about 80 wt % Si, 5 wt % graphite and 15 wt % glassy carbon (from resin) and are laminated on 15 μm Cu foil. The average loading is about 2-5 mg/cm². The cathodes contain about 92 wt % NCA, 4 wt % Super P and 4 wt % PVDF5130, and are coated on 15 μm Al foil, for example. The average loading is about 20-30 mg/cm². The photo in FIG. 5 illustrates that 1.5 wt % APTMS-containing electrolyte-based pouch full cells show significant gas suppression compared with reference electrolyte-based control cells after the 60° C. storage test without clamping with different time of 1, 2, 3, or 4 weeks.

Example 2:
3-(2-Aminoethylamino)propyl]trimethoxysilane (AEAPTMS)

1 wt % 3-(2-Aminoethylamino)propyl]trimethoxysilane (AEAPTMS) may be used as an electrolyte additive and added into 1.2 M $LiPF_6$ in FEC/EMC (3/7 wt %)-base reference electrolytes; Si-dominant anode//NCA cathode full pouch cells may be built accordingly. These cells may be tested using a 1 C/0.5 C charge/discharge cycle regime with the working voltage window of 4.2V to 3.1V at both 25° C. and 60° C., respectively. In further experiments, 1.5 wt % AEAPTMS may be used as an electrolyte additive and added into 1.2 M $LiPF_6$ in FEC/EMC (3/7 wt %)-base reference electrolytes; Si-dominant anode//NCA cathode full pouch cells may be built accordingly. The 60° C. storage test without clamping may be carried out and the corresponding OCV, impedance & thickness may be measured every 1 week for 4 weeks.

Figure 6A:
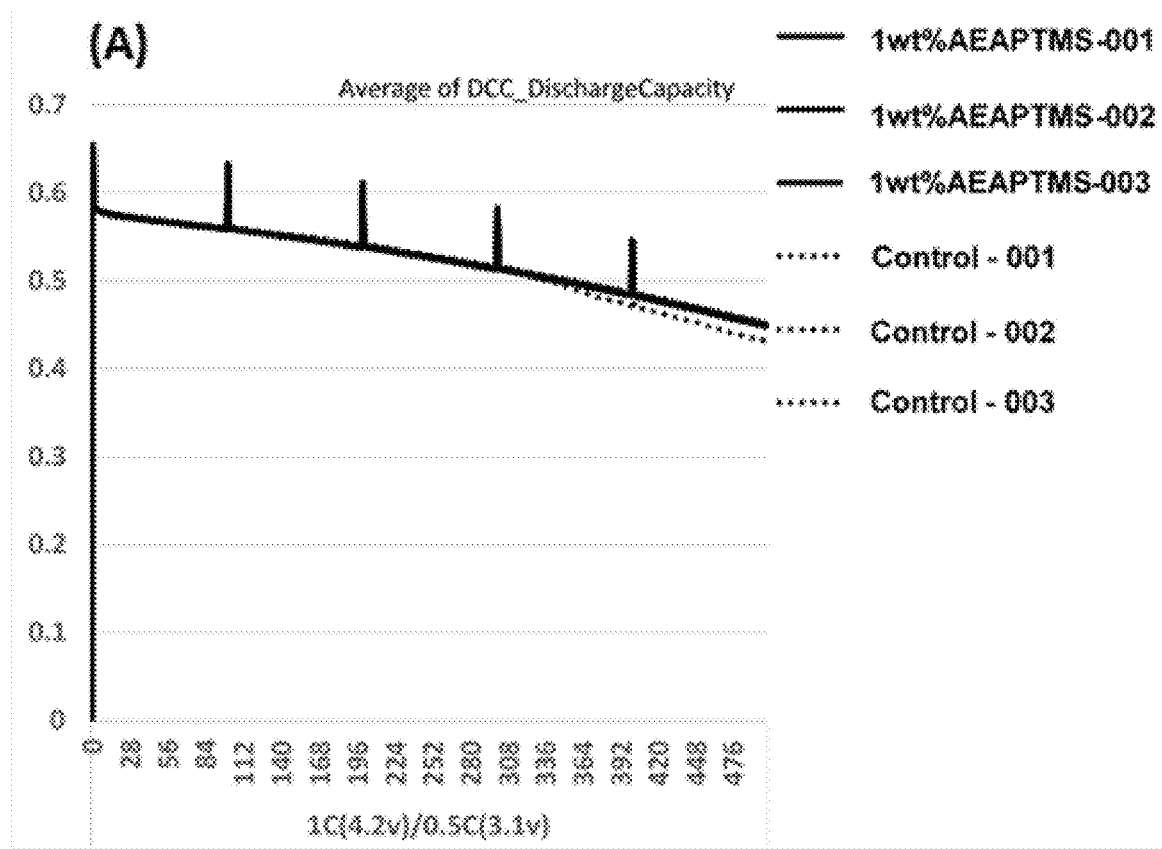
FIGS. 6A and 6B show the capacity retention (FIG. 6A) and normalized capacity retention (FIG. 6B) of Si-dominant anode//NCA cathode pouch full cells tested at 25° C. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % AEAPTMS, in accordance with an example embodiment of the disclosure.
Figure 6B:
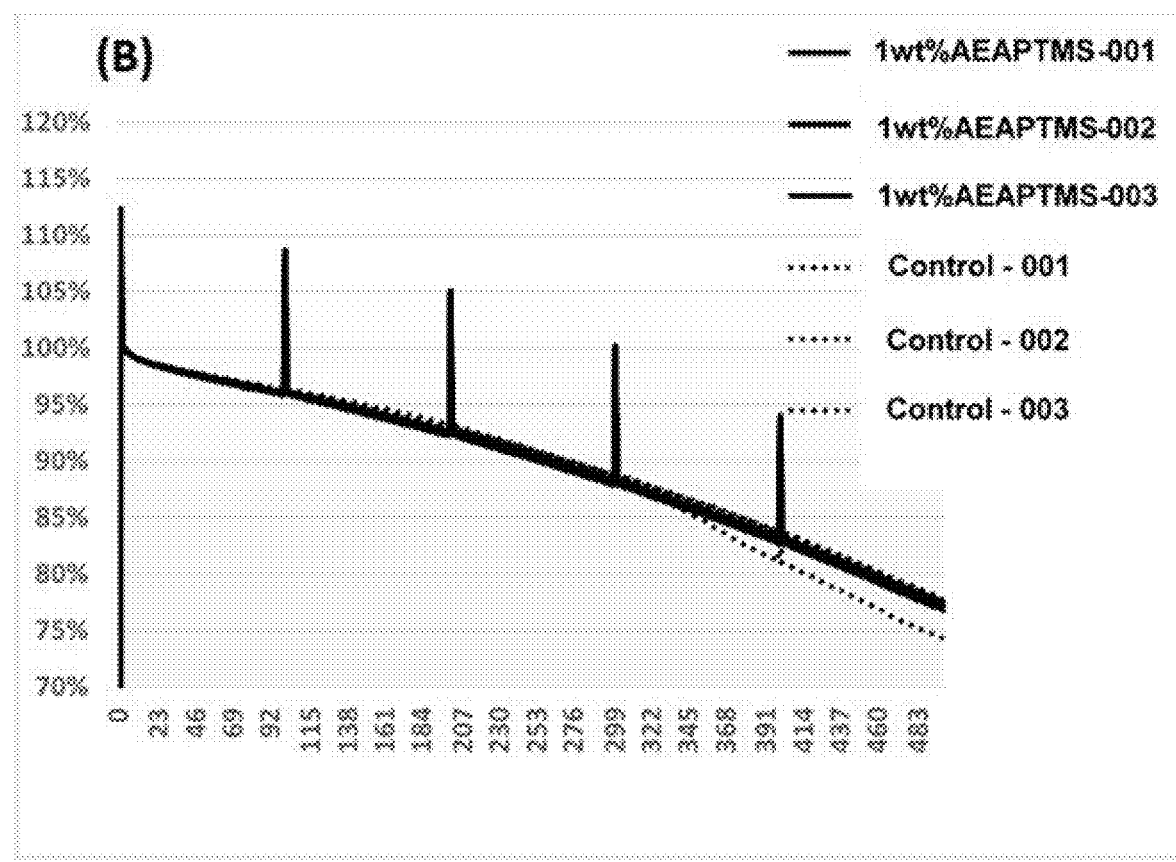

FIG. 6 demonstrates the capacity retention (A) and normalized capacity retention (B) of Si-dominant anode//NCA cathode pouch full cells. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % AEAPTMS. The Si-dominant anodes contain about 80 wt % Si, 5 wt % graphite and 15 wt % glassy carbon (from resin) and are laminated on 15 μm Cu foil. The average loading is about 2-5 mg/cm². The cathodes contain about 92 wt % NCA, 4 wt % Super P and 4 wt % PVDF5130, and are coated on 15 μm Al foil. The average loading is about 20-30 mg/cm². These cells may be tested at 25° C.

The long-term cycling program for both control and the 1 wt % AEAPTMS-containing electrolyte-based pouch full cells are the same as shown in Example 1 (FIG. 2).

As demonstrated by the data in FIG. 6, 1 wt % AEAPTMS-containing electrolyte-based pouch full cells have similar cycle performance with reference electrolyte-based control cells when tested with 1 C(4.2V)/0.5 C(3.1V) at 25° C.

Figure 7A:
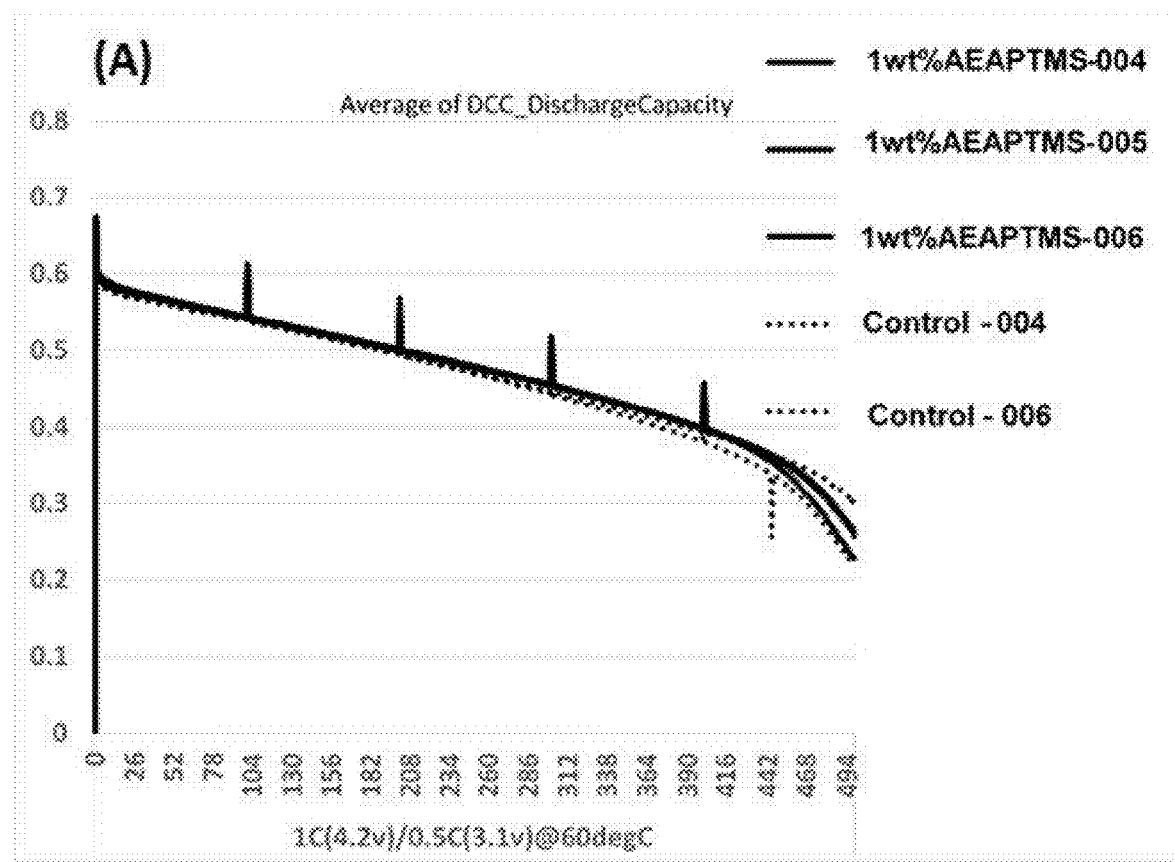
FIGS. 7A and 7B show the capacity retention (FIG. 7A) and normalized capacity retention (FIG. 7B) of Si-dominant anode//NCA cathode pouch full cells tested at 60° C. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % AEAPTMS, in accordance with an example embodiment of the disclosure.
Figure 7B:
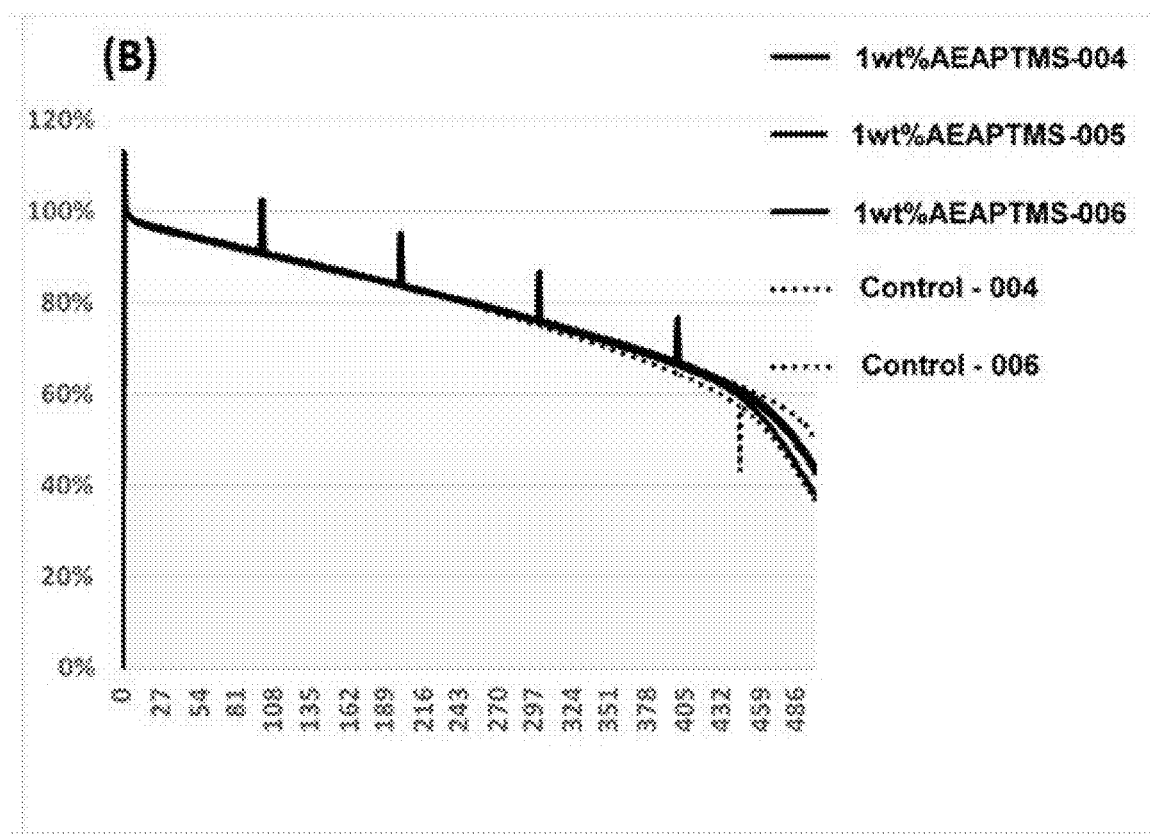

FIG. 7 demonstrates the capacity retention (A) and normalized capacity retention (B) of Si-dominant anode//NCA cathode pouch full cells. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % AEAPTMS. The Si-dominant anodes contain about 80 wt % Si, 5 wt % graphite and 15 wt % glassy carbon (from resin) and are laminated on 15 μm Cu foil. The average loading is about 2-5 mg/cm². The cathodes contain about 92 wt % NCA, 4 wt % Super P and 4 wt % PVDF5130, and are coated on 15 μm Al foil. The average loading may be about 20-30 mg/cm². These cells may be tested at 60° C.

The long-term cycling program for both control and the 1 wt % AEAPTMS-containing electrolyte-based pouch full cells are the same as shown in Example 1 (FIG. 2).

As demonstrated by the data in FIG. 7, 1 wt % AEAPTMS-containing electrolyte-based pouch full cells have similar cycle performance with reference electrolyte-based control cells when tested with 1 C(4.2V)/0.5 C(3.1V) at 60° C.

Figure 8:
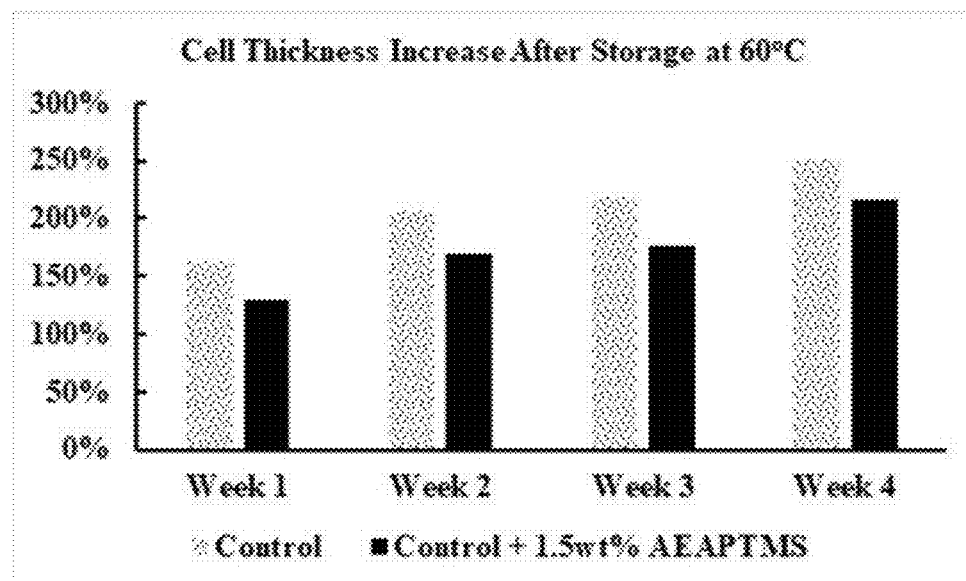
FIG. 8 shows Si-dominant anode//NCA cathode pouch full cells thickness measurement after 60° C. storage tests. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1.5 wt % AEAPTMS, in accordance with an example embodiment of the disclosure.

FIG. 8 shows Si-dominant anode//NCA cathode pouch full cells thickness measurement after 60° C. storage tests. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1.5 wt % AEAPTMS. The Si-dominant anodes contain about 80 wt % Si, 5 wt % graphite and 15 wt % glassy carbon (from resin) and are laminated on 15 μm Cu foil. The average loading is about 2-5 mg/cm². The cathodes contain about 92 wt % NCA, 4 wt % Super P and 4 wt % PVDF5130, and are coated on 15 μm Al foil. The average loading is about 20-30 mg/cm².

The 60° C. storage test without clamping for both control and the 1.5 wt % AEAPTMS-containing electrolyte-based pouch full cells are the same as shown in FIG. 4. The chart in FIG. 8 indicates that 1.5 wt % AEAPTMS-containing electrolyte-based pouch full cells have less thickness increase compared with the reference electrolyte-based control cells after 60° C. storage test without clamping with different time of 1, 2, 3, or 4 weeks.

Figure 9:
FIG. 9 is a photo of Si-dominant anode//NCA cathode pouch full cells after the 60° C. storage test without clamping for 4 weeks. The electrolytes used may be: (top) 1.2 M $LiPF_6$ in FEC/EMC (3/7 wt %)—Control, (bottom) 1.2 M $LiPF_6$ in FEC/EMC (3/7 wt %)+1.5 wt % AEAPTMS, in accordance with an example embodiment of the disclosure.

FIG. 9 is a photo of Si-dominant anode//NCA cathode pouch full cells after the 60° C. Storage test without clamping for 4 weeks. The electrolytes used may be: (top) 1.2 M LiPF$_6$ in FEC/EMC (3/7 wt %)—Control, (bottom) 1.2 M LiPF$_6$ in FEC/EMC (3/7 wt %)+1.5 wt % AEAPTMS. The Si-dominant anodes contain about 80 wt % Si, 5 wt % graphite and 15 wt % glassy carbon (from resin) and are laminated on 15 μm Cu foil. The average loading may be about 2-5 mg/cm². The cathodes contain about 92 wt % NCA, 4 wt % Super P and 4 wt % PVDF5130, and are coated on 15 μm Al foil. The average loading may be about 20-30 mg/cm². The photo in FIG. 9 illustrates that 1.5 wt % AEAPTMS-containing electrolyte-based pouch full cells show significant gas suppression compared with reference electrolyte-based control cells after 60° C. storage test without clamping with different time of 1, 2, 3, or 4 weeks.

Example 3:
2,4,6-Trimethyl-2,4,6-trivinylcyclotrisilazane (TriMTVCTS)

0.5 or 1 wt % TriMTVCTS may be used as an electrolyte additive and added into 1.2 M LiPF$_6$ in FEC/EMC (3/7 wt %)-base reference electrolytes; Si-dominant anode//NCA cathode full pouch cells may be built accordingly. These cells may be tested using a 4 C/0.5 C charge/discharge cycle regime with the working voltage window of 4.2V to 3.1V at 25° C. In further experiments, 1 wt % TriMTVCTS may be used as an electrolyte additive and added into 1.2 M LiPF$_6$ in FEC/EMC (3/7 wt %)-base reference electrolytes, with Si-dominant anode//NCA cathode full pouch cells built accordingly. The 60° C. storage test without clamping may be carried out and the corresponding OCV, impedance & thickness may be measured every 1 week for 4 weeks.

Figure 10A:
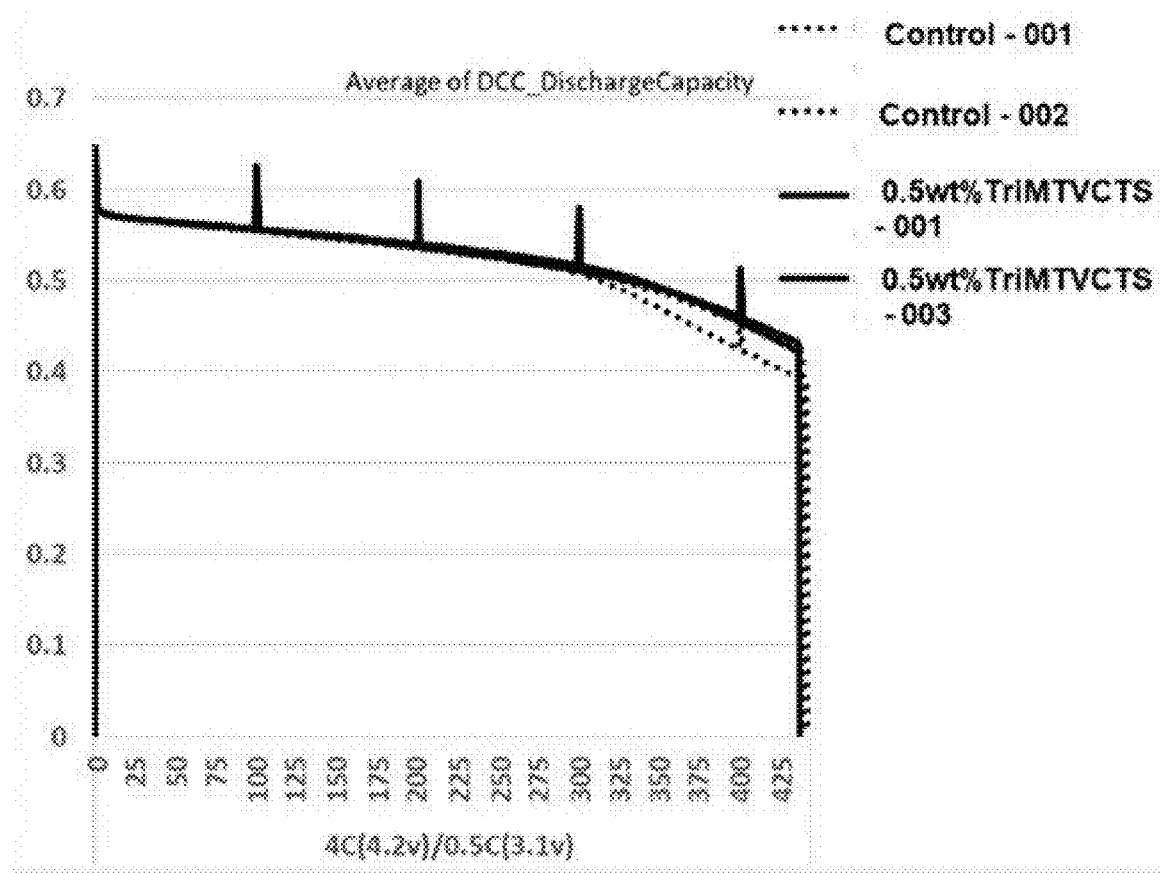
FIGS. 10A and 10B show the capacity retention (FIG. 10A) and normalized capacity retention (FIG. 10B) of Si-dominant anode//NCA cathode pouch full cells tested at 25° C. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % TriMTVCTS, in accordance with an example embodiment of the disclosure.
Figure 10B:
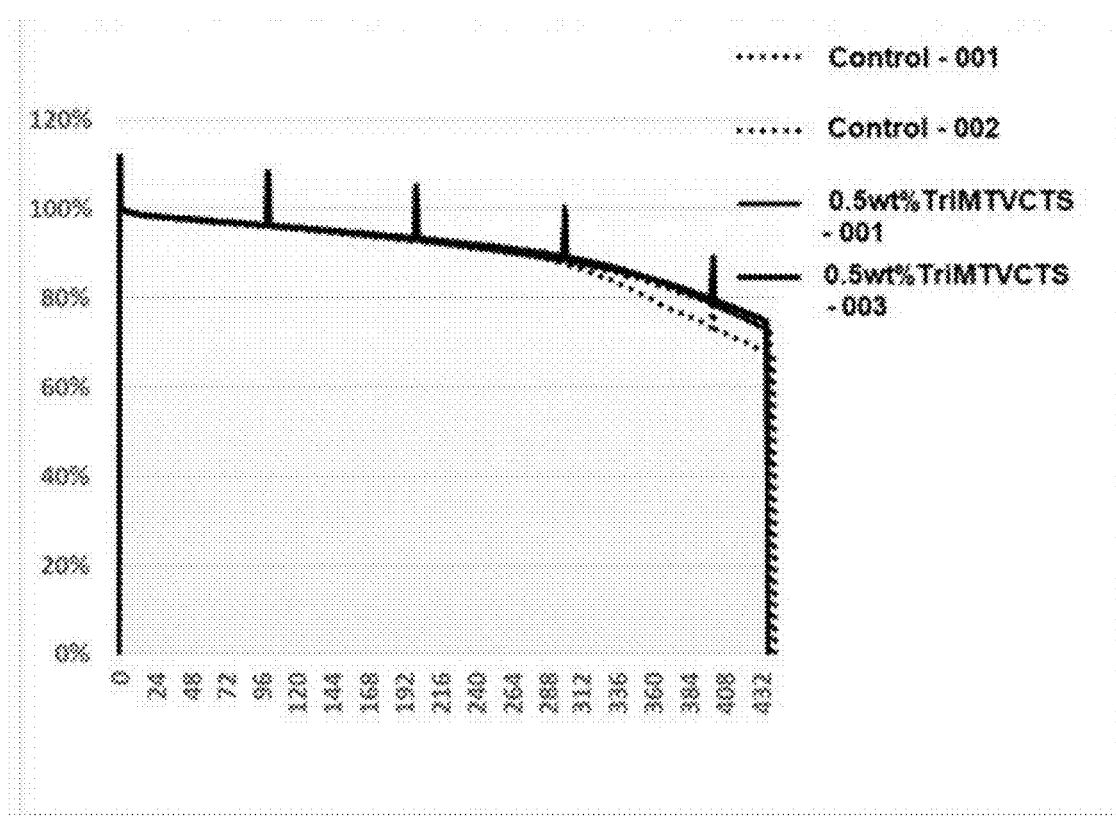

FIG. 10 demonstrates the capacity retention (A) and normalized capacity retention (B) of Si-dominant anode//NCA cathode pouch full cells. The electrolytes used may be: (dotted line) 1.2 M LiPF$_6$ in FEC/EMC (3/7 wt %)—Control, (thick solid line) 1.2 M LiPF$_6$ in FEC/EMC (3/7 wt %)+1 wt % TriMTVCTS. The Si-dominant anodes contain about 80 wt % Si, 5 wt % graphite and 15 wt % glassy carbon (from resin) and are laminated on 15 μm Cu foil. The average loading is about 2-5 mg/cm². The cathodes contain about 92 wt % NCA, 4 wt % Super P and 4 wt % PVDF5130, and are coated on 15 μm Al foil. The average loading may be about 20-30 mg/cm². These cells may be tested at 25° C.

The long-term cycling program for both control and the 1 wt % TriMTVCTS-containing electrolyte-based pouch full cells include: (i) At the 1$^{st}$ cycle, charge at 0.33 C to 4.2 V until 0.05 C, rest 5 minutes, discharge at 0.33 C to 3.1 V, rest 5 minutes; and (ii) from the 2$^{nd}$ cycle, charge at 4 C to 4.2 V until 0.05 C, rest 5 minutes, discharge at 0.5 C to 3.1 V, rest 5 minutes. After every 100 cycles, the test conditions in the 1$^{st}$ cycle may be repeated.

As demonstrated by the data in FIG. 10, 1 wt % TriMTVCTS-containing electrolyte-based pouch full cells have similar cycle performance with reference electrolyte-based control cells when tested with 4 C(4.2V)/0.5 C(3.1V) at 25° C.

Figure 11:
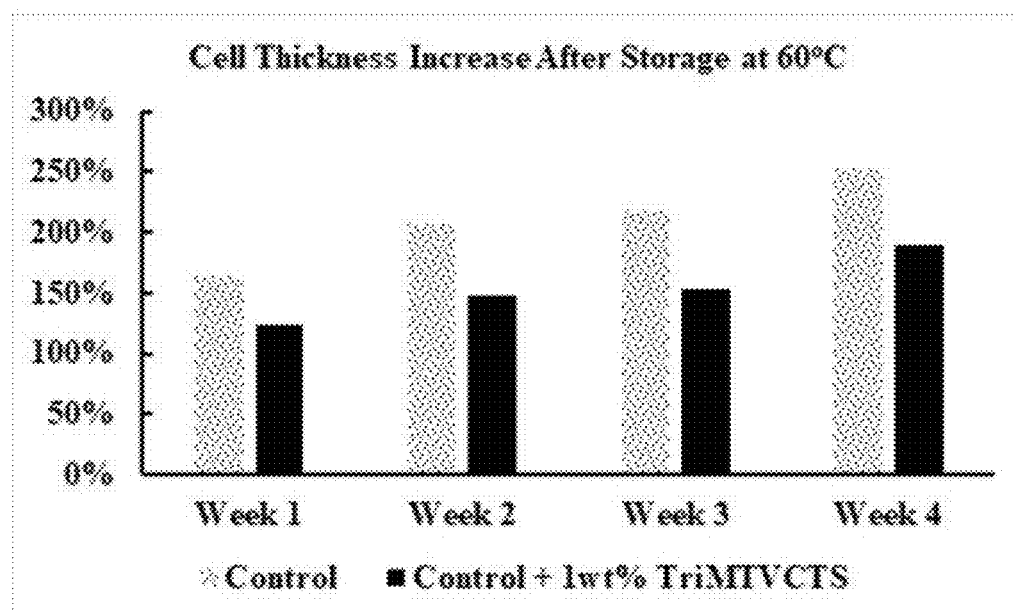
FIG. 11 shows Si-dominant anode//NCA cathode pouch full cells thickness measurement after 60° C. storage tests. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % TriMTVCTS, in accordance with an example embodiment of the disclosure.

FIG. 11 shows Si-dominant anode//NCA cathode pouch full cells thickness measurement after 60° C. storage tests. The electrolytes used may be: (dotted line) 1.2 M LiPF$_6$ in FEC/EMC (3/7 wt %)—Control, (thick solid line) 1.2 M LiPF$_6$ in FEC/EMC (3/7 wt %)+1 wt % TriMTVCTS. The Si-dominant anodes contain about 80 wt % Si, 5 wt % graphite and 15 wt % glassy carbon (from resin) and are laminated on 15 μm Cu foil. The average loading may be about 2-5 mg/cm². The cathodes may contain about 92 wt % NCA, 4 wt % Super P and 4 wt % PVDF5130, and may be coated on 15 μm Al foil. The average loading may be about 20-30 mg/cm².

The 60° C. Storage test without clamping for both control and the 1 wt % TriMTVCTS-containing electrolyte-based pouch full cells are the same as shown in FIG. 4. The chart in FIG. 11 indicates that 1 wt % TriMTVCTS-containing electrolyte-based pouch full cells have less thickness increase compared with the reference electrolyte-based control cells after 60° C. storage test without clamping with different time of 1, 2, 3, or 4 weeks.

Figure 12:
FIG. 12 is a photo of Si-dominant anode//NCA cathode pouch full cells after the 60° C. storage test without clamping for 4 weeks. The electrolytes used may be: (top) 1.2 M $LiPF_6$ in FEC/EMC (3/7 wt %)—Control, (bottom) 1.2 M $LiPF_6$ in FEC/EMC (3/7 wt %)+1 wt % TriMTVCTS, in accordance with an example embodiment of the disclosure.

FIG. 12 is a photo of Si-dominant anode//NCA cathode pouch full cells after the 60° C. storage test without clamping for 4 weeks. The electrolytes used are: (top) 1.2 M LiPF$_6$ in FEC/EMC (3/7 wt %)—Control, (bottom) 1.2 M LiPF$_6$ in FEC/EMC (3/7 wt %)+1 wt % TriMTVCTS. The Si-dominant anodes contain about 80 wt % Si, 5 wt % graphite and 15 wt % glassy carbon (from resin) and are laminated on 15 μm Cu foil. The average loading may be about 2-5 mg/cm2. The cathodes contain about 92 wt % NCA, 4 wt % Super P and 4 wt % PVDF5130, and are coated on 15 μm Al foil. The average loading may be about 20-30 mg/cm². The photo in FIG. 12 illustrates that 1 wt % TriMTVCTS-containing electrolyte-based pouch full cells show significant gas suppression compared with reference electrolyte-based control cells after 60° C. Storage test without clamping with different time of 1, 2, 3, or 4 weeks.

Example 4:
Hexakis(allylamino)cyclotriphosphazene (HALCPZ)

1 wt % Hexakis(allylamino)cyclotriphosphazene (HAL-CPZ) may be used as an electrolyte additive and added into 1.2 M LiPF$_6$ in FEC/EMC (3/7 wt %)-base reference electrolytes. The Si-dominant anode//NCA cathode full pouch cells may be built accordingly. These cells may be tested using a 4 C/0.5 C charge/discharge cycle regime with the working voltage window of 4.2V to 3.1V at 25° C. and 60° C., respectively. In further experiments, 5 wt % HALCPZ may be used as an electrolyte additive and added into 1.2 M LiPF$_6$ in FEC/EMC (3/7 wt %)-base reference electrolytes. The Si-dominant anode//NCA cathode full pouch cells may be built accordingly. The 60° C. storage test without clamping may be carried out and the corresponding OCV, impedance & thickness may be measured every 1 week for 4 weeks.

Figure 13A:
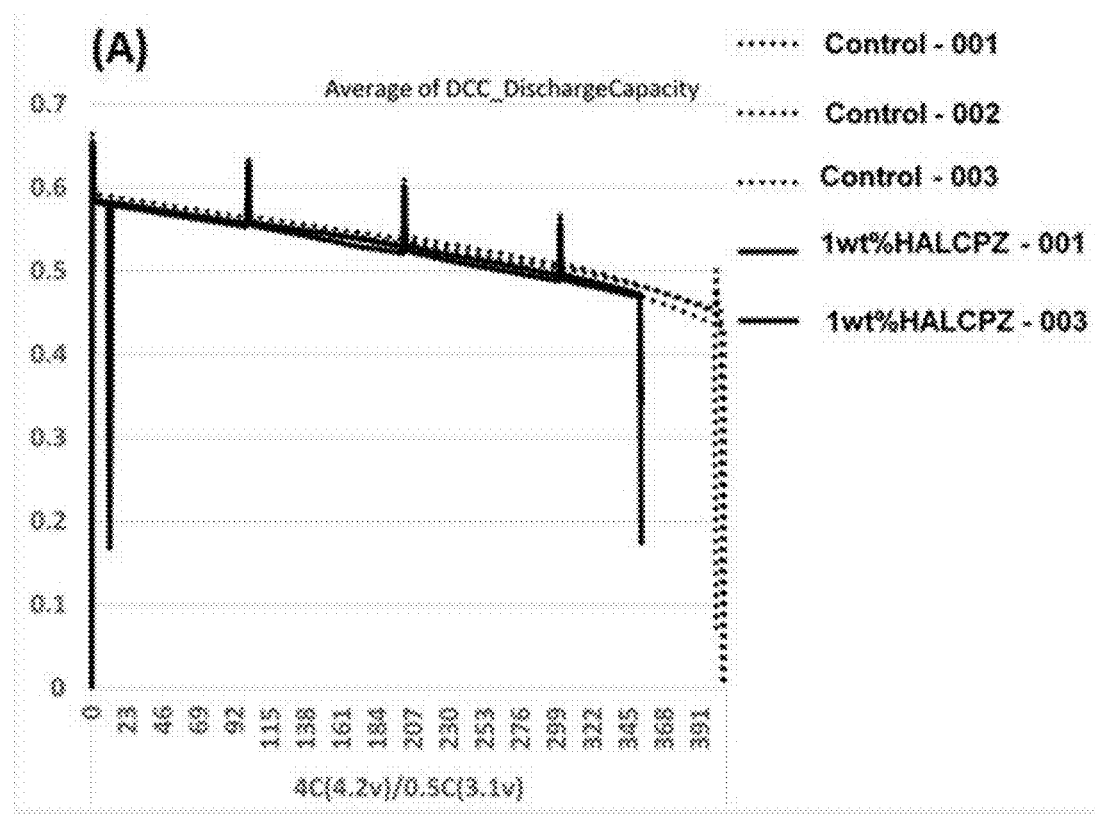
FIGS. 13A and 13B demonstrate the capacity retention (FIG. 13A) and normalized capacity retention (FIG. 13B) of Si-dominant anode//NCA cathode pouch full cells tested at 25° C. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % HALCPZ, in accordance with an example embodiment of the disclosure.
Figure 13B:
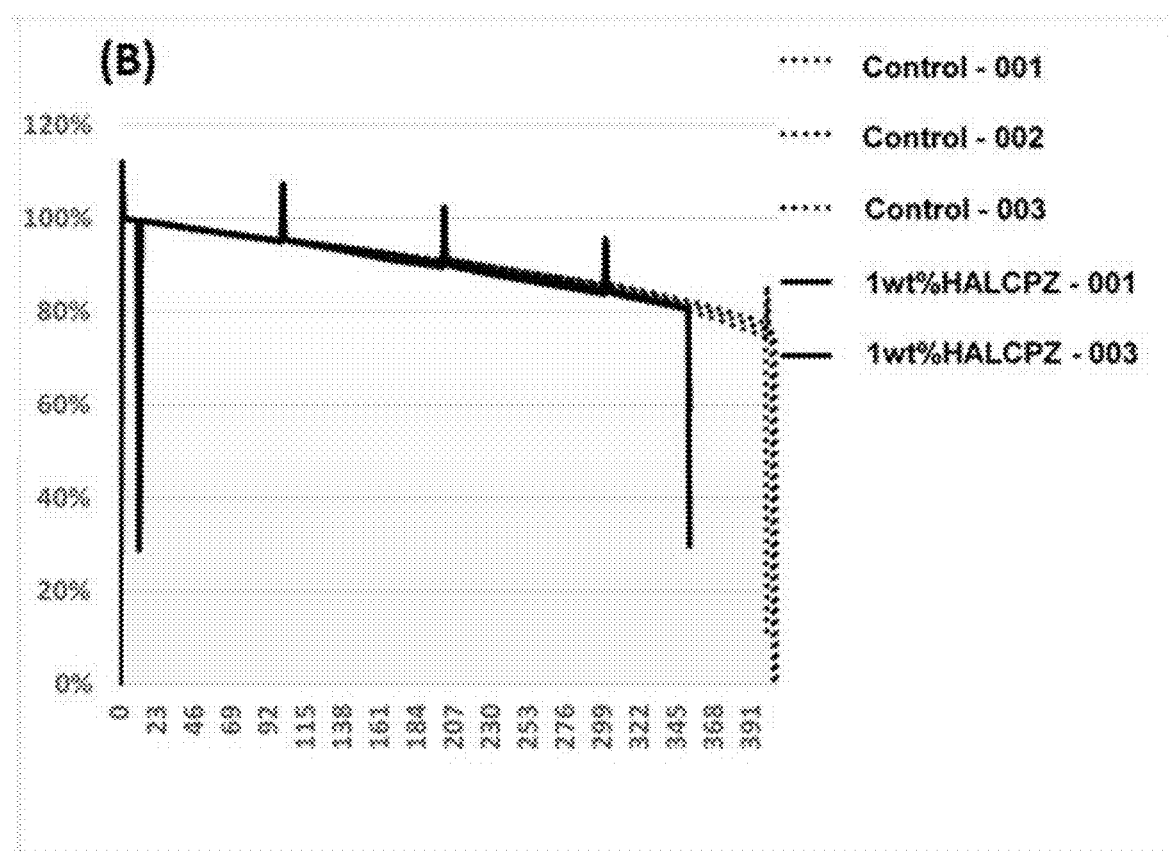

FIG. 13 demonstrates the capacity retention (A) and normalized capacity retention (B) of Si-dominant anode//NCA cathode pouch full cells. The electrolytes used may be: (dotted line) 1.2 M LiPF$_6$ in FEC/EMC (3/7 wt %)—Control, (thick solid line) 1.2 M LiPF$_6$ in FEC/EMC (3/7 wt %)+1 wt % HALCPZ. The Si-dominant anodes contain about 80 wt % Si, 5 wt % graphite and 15 wt % glassy carbon (from resin) and are laminated on 15 μm Cu foil. The average loading may be about 2-5 mg/cm². The cathodes contain about 92 wt % NCA, 4 wt % Super P and 4 wt % PVDF5130, and are coated on 15 μm Al foil. The average loading may be about 20-30 mg/cm². These cells may be tested at 25° C.

The long-term cycling program for both control and the 1 wt % HALCPZ-containing electrolyte-based pouch full cells are the same as shown in Example 3 (FIG. 10).

As demonstrated by the data in FIG. 13, 1 wt % HALCPZ-containing electrolyte-based pouch full cells have similar cycle performance with reference to electrolyte-based control cells when tested with 4 C(4.2V)/0.5 C(3.1V) at 25° C.

Figure 14A:
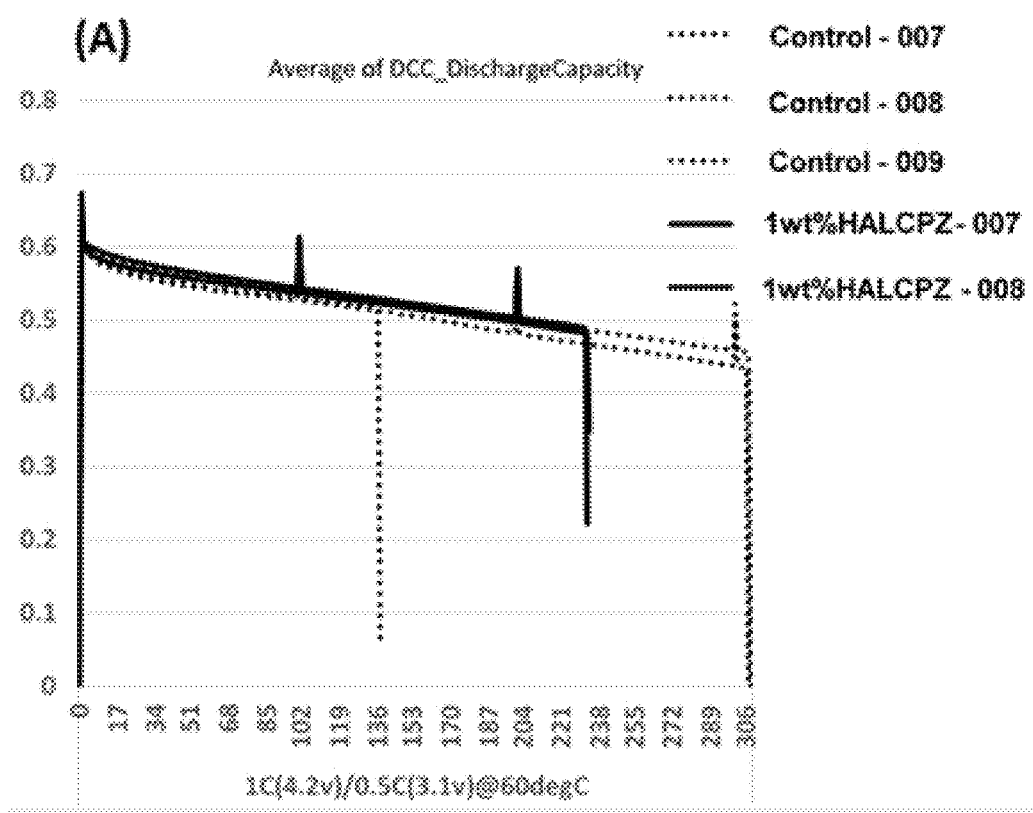
FIGS. 14A and 14B demonstrate the capacity retention (FIG. 14A) and normalized capacity retention (FIG. 14B) of Si-dominant anode//NCA cathode pouch full cells tested at 60° C. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % HALCPZ, in accordance with an example embodiment of the disclosure.
Figure 14B:
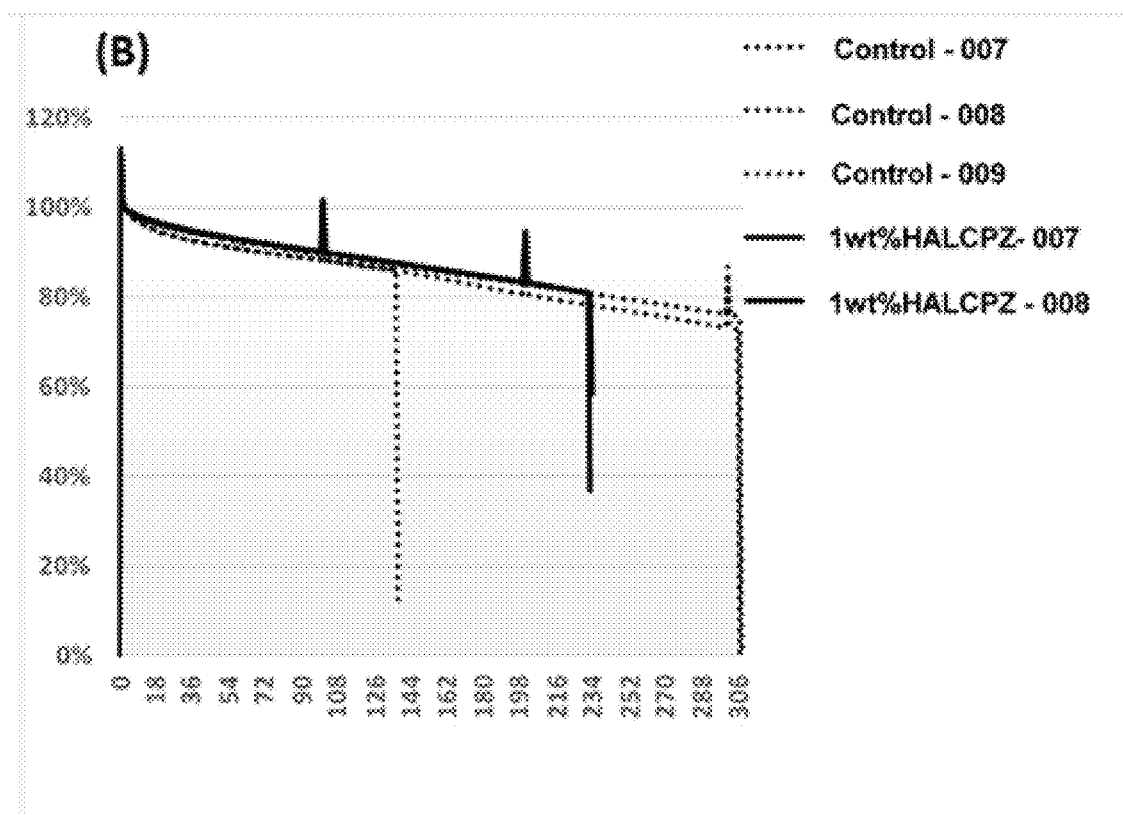

FIG. 14 demonstrates the capacity retention (A) and normalized capacity retention (B) of Si-dominant anode// NCA cathode pouch full cells. The electrolytes used may be: (dotted line) 1.2 M $LiPF_6$ in FEC/EMC (3/7 wt %)—Control, (thick solid line) 1.2 M $LiPF_6$ in FEC/EMC (3/7 wt %)+1 wt % HALCPZ. The Si-dominant anodes contain about 80 wt % Si, 5 wt % graphite and 15 wt % glassy carbon (from resin) and are laminated on 15 μm Cu foil. The average loading may be about 2-5 mg/cm². The cathodes contain about 92 wt % NCA, 4 wt % Super P and 4 wt % PVDF5130, and are coated on 15 μm Al foil. The average loading is about 20-30 mg/cm². These cells may be tested at 60° C.

The long-term cycling program for both control and the 1 wt % HALCPZ-containing electrolyte-based pouch full cells are the same as shown in Example 3 (FIG. 10).

As demonstrated by the data in FIG. 14, 1 wt % HALCPZ-containing electrolyte-based pouch full cells have similar cycle performance with reference to electrolyte-based control cells when tested with 4 C(4.2V)/0.5 C(3.1V) at 60° C.

Figure 15:
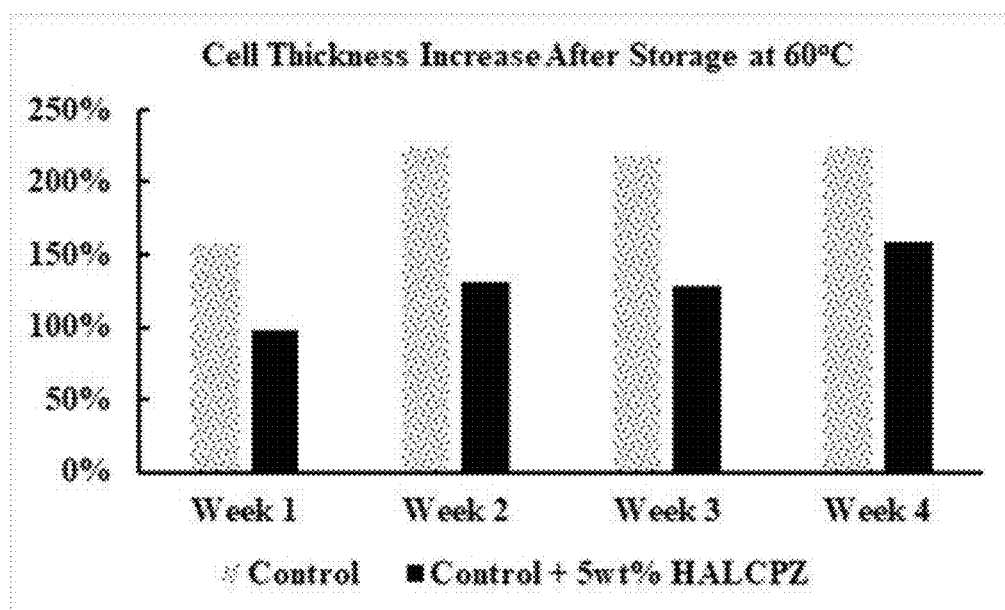
FIG. 15 shows Si-dominant anode//NCA cathode pouch full cells thickness measurement after 60° C. storage tests. The electrolytes used may be: (dotted line) 1.2 M $LiPF_6$ in FEC/EMC (3/7 wt %)—Control, (thick solid line) 1.2 M LiPF$_6$ in FEC/EMC (3/7 wt %)+5 wt % HALCPZ.

FIG. 15 shows Si-dominant anode//NCA cathode pouch full cells thickness measurement after 60° C. storage tests. The electrolytes may be: (dotted line) 1.2 M $LiPF_6$ in FEC/EMC (3/7 wt %)—Control, (thick solid line) 1.2 M $LiPF_6$ in FEC/EMC (3/7 wt %)+5 wt % HALCPZ. The Si-dominant anodes contain about 80 wt % Si, 5 wt % graphite and 15 wt % glassy carbon (from resin) and may be laminated on 15 μm Cu foil. The average loading may be about 2-5 mg/cm². The cathodes contain about 92 wt % NCA, 4 wt % Super P and 4 wt % PVDF5130, and may be coated on 15 μm Al foil. The average loading may be about 20-30 mg/cm².

The 60° C. storage test without clamping for both control and the 1 wt % TriMTVCTS-containing electrolyte-based pouch full cells are the same as shown in FIG. 4. The chart in FIG. 15 indicates that 5 wt % HALCPZ-containing electrolyte-based pouch full cells have less thickness increase compared with the reference electrolyte-based control cells 60° C. storage test without clamping with different time of 1, 2, 3, or 4 weeks.

Figure 16:
FIG. 16 is a photo of Si-dominant anode//NCA cathode pouch full cells after the 60° C. storage test without clamping for 4 weeks. The electrolytes used may be: (top) 1.2 M LiPF$_6$ in FEC/EMC (3/7 wt %)—Control, (bottom) 1.2 M LiPF$_6$ in FEC/EMC (3/7 wt %)+5 wt % HALCPZ.

FIG. 16 is a photo of Si-dominant anode//NCA cathode pouch full cells after the 60° C. storage test without clamping for 4 weeks. The electrolytes may be: (top) 1.2 M $LiPF_6$ in FEC/EMC (3/7 wt %)—Control, (bottom) 1.2 M $LiPF_6$ in FEC/EMC (3/7 wt %)+5 wt % HALCPZ. The Si-dominant anodes contain about 80 wt % Si, 5 wt % graphite and 15 wt % glassy carbon (from resin) and may be laminated on 15 μm Cu foil. The average loading may be about 2-5 mg/cm². The cathodes contain about 92 wt % NCA, 4 wt % Super P and 4 wt % PVDF5130, and are coated on 15 μm Al foil. The average loading may be about 20-30 mg/cm². The photo in FIG. 15 illustrates that 5 wt % HALCPZ-containing electrolyte-based pouch full cells show significant gas suppression compared with reference electrolyte-based control cells after 60° C. storage test without clamping with different time of 1, 2, 3, or 4 weeks.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "Example" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A battery, the battery comprising:
 a cathode, an electrolyte, and an anode, wherein one or both of said cathode and said anode contain one or more functional aliphatic and/or aromatic amine compounds as electrolyte additives to reduce gas generation in said battery;
 wherein said one or more functional aliphatic and/or aromatic amine compounds comprises Hexakis(allylamino)cyclotriphosphazene (HALCPZ).

2. The battery according to claim 1, wherein said one or more functional aliphatic and/or aromatic amine compounds are incorporated into said one or both of said cathode and said anode by including the compounds in an electrode material slurry.

3. The battery according to claim 1, wherein said one or more functional aliphatic and/or aromatic amine compounds are incorporated into said one or both of said cathode and said anode by soaking the electrode material in a solution of said functional aliphatic and/or aromatic amine compounds.

4. The battery according to claim 1, wherein said one or more functional aliphatic and/or aromatic amine compounds are incorporated into an anode of a Si anode-based or graphite anode-based Li-ion battery.

5. The battery according to claim 1, wherein said one or more functional aliphatic and/or aromatic amine compounds are incorporated into a cathode made from layered oxides or polyanionic compounds.

* * * * *